US009467021B2

(12) United States Patent
Wright

(10) Patent No.: US 9,467,021 B2
(45) Date of Patent: Oct. 11, 2016

(54) ENGINE AND INDUCTION GENERATOR

(71) Applicant: Matthew Weston Wright, White Lake, MI (US)

(72) Inventor: Matthew Weston Wright, White Lake, MI (US)

(73) Assignee: SINE WAVES, INC., White Lake, MI (US)

( * ) Notice: Subject to any disclaimer, the term of this patent is extended or adjusted under 35 U.S.C. 154(b) by 550 days.

(21) Appl. No.: 13/940,753

(22) Filed: Jul. 12, 2013

(65) Prior Publication Data

US 2014/0159378 A1 Jun. 12, 2014

Related U.S. Application Data

(63) Continuation-in-part of application No. 12/931,970, filed on Feb. 15, 2011, now Pat. No. 8,695,565.

(60) Provisional application No. 61/338,235, filed on Feb. 16, 2010.

(51) Int. Cl.
  *H02K 7/18* (2006.01)
  *F01C 1/22* (2006.01)
  (Continued)

(52) U.S. Cl.
  CPC ............... *H02K 7/1823* (2013.01); *F01C 1/22* (2013.01); *F01C 11/008* (2013.01); *F01C 13/00* (2013.01);
  (Continued)

(58) Field of Classification Search
  CPC ........ F01C 1/22; F01C 11/00; F01C 11/002; F01C 11/004; F01C 11/006; F01C 11/008; F01C 13/00; F01C 13/04; F02B 55/08; F02B 2053/005; H02K 17/00; H02K 17/02; H02K 17/16; H02K 17/165; H02K 17/18; H02K 17/185; H02K 17/34; H02K 17/42

USPC .............. 310/125, 166, 171, 211, 212
  See application file for complete search history.

(56) References Cited

U.S. PATENT DOCUMENTS 688,494 A * 12/1901 Stern ...................... H02K 35/02
  123/2
1,006,907 A 10/1911 Buechi
  (Continued)

FOREIGN PATENT DOCUMENTS

DE 4020176 A1 * 1/1991 ............. F02B 63/04
DE 102011119498 A1 * 5/2013 ............. F01C 13/00
  (Continued)

OTHER PUBLICATIONS

DE 4020176 A1 English Translation.*
  (Continued)

*Primary Examiner* — Kenneth Bomberg
*Assistant Examiner* — Jessica Kebea
(74) *Attorney, Agent, or Firm* — Oppenhuizen Law PLC; David L. Oppenhuizen

(57) ABSTRACT

An internal combustion power-plant comprising a combustion housing having a crankshaft that is driven when a fuel is combusted in the combustion housing. An induction generator is positioned around the combustion housing. The induction generator includes a stator connected to an outer surface of the combustion housing and an induction rotor that rotates about the stator. The induction rotor and the crankshaft are mechanically coupled to a sprocket via a clutch mechanism. The stator is electrically connected to power electronics that are within a nacelle that supports and surrounds the power-plant, as well as acts as a heat exchanger for the power-plant and power electronics closed loop cooling system. The induction generator operates as a generator to draw power off the crankshaft, via the clutch mechanism, to rotate the induction rotor which in turn induces current in the stator.

19 Claims, 29 Drawing Sheets

(51) Int. Cl.
*F01C 11/00* (2006.01)
*F01C 13/00* (2006.01)
*F02B 53/02* (2006.01)
*F02B 55/16* (2006.01)
*F02C 3/04* (2006.01)
*F02D 25/04* (2006.01)
*F02B 53/00* (2006.01)
*F04D 25/04* (2006.01)

(52) U.S. Cl.
CPC ............... *F02B 53/02* (2013.01); *F02B 55/16* (2013.01); *F02C 3/04* (2013.01); *F04D 25/04* (2013.01); *F02B 2053/005* (2013.01); *F04C 2240/30* (2013.01); *F04C 2240/60* (2013.01); *Y02T 10/17* (2013.01); *Y02T 50/672* (2013.01)

(56) References Cited

U.S. PATENT DOCUMENTS

| | | | |
|---|---|---|---|
| 1,263,736 A | | 4/1918 | Bower |
| 2,303,093 A | | 11/1942 | Henry |
| 2,665,668 A | | 1/1954 | Ward |
| 3,007,302 A | | 11/1961 | Vincent |
| 3,059,428 A | | 10/1962 | Galonska |
| 3,242,665 A | | 3/1966 | Flater |
| 3,358,439 A | | 12/1967 | De Castelet |
| 3,934,418 A | | 1/1976 | Debaun |
| 3,945,200 A | | 3/1976 | Wright |
| 3,993,029 A | | 11/1976 | Eiermann et al. |
| 4,019,324 A | * | 4/1977 | Coxon ............... F02B 25/28 123/65 BA |
| 4,078,529 A | * | 3/1978 | Warwick ............... F01B 1/0655 123/44 C |
| 4,586,337 A | | 5/1986 | Fox |
| 4,742,683 A | | 5/1988 | Heminghous et al. |
| 4,749,334 A | | 6/1988 | Byrne |
| 4,815,282 A | | 3/1989 | Wilkinson et al. |
| 4,836,149 A | | 6/1989 | Newbold |
| 4,989,410 A | | 2/1991 | Smith |
| 5,056,315 A | | 10/1991 | Jenkins |
| 5,692,372 A | | 12/1997 | Whurr |
| 5,709,088 A | | 1/1998 | Acaster |
| 6,230,670 B1 | * | 5/2001 | Russell ............... F02B 57/08 123/44 B |
| 6,590,312 B1 | * | 7/2003 | Seguchi ............... B60K 6/26 310/114 |
| 6,698,395 B1 | | 3/2004 | Vasilantone |
| 6,845,617 B1 | | 1/2005 | Allen et al. |
| 7,412,831 B2 | | 8/2008 | Ullyott |
| 7,984,702 B2 | | 7/2011 | Russell |
| 8,109,074 B2 | * | 2/2012 | Rom ............... F01C 1/20 123/249 |
| 8,127,635 B2 | | 3/2012 | Tsukada et al. |
| 8,186,038 B2 | * | 5/2012 | Edelson ............... H02K 1/02 29/596 |
| 8,225,767 B2 | | 7/2012 | Tinney |
| 8,276,694 B2 | | 10/2012 | Stervik et al. |
| 8,334,604 B1 | | 12/2012 | Dunn et al. |
| 8,749,079 B1 | * | 6/2014 | Dunn ............... F02B 63/04 290/1 R |
| 2006/0065232 A1 | * | 3/2006 | Wurtz ............... F01C 11/004 123/204 |
| 2007/0144284 A1 | | 6/2007 | Mitsubori et al. |
| 2008/0095611 A1 | * | 4/2008 | Storage ............... F01D 25/125 415/116 |
| 2008/0122300 A1 | * | 5/2008 | Cho ............... H02K 1/148 310/43 |
| 2011/0133486 A1 | | 6/2011 | Maglaque |
| 2011/0204650 A1 | | 8/2011 | Dunne |
| 2012/0086217 A1 | * | 4/2012 | Benda ............... B60L 11/126 290/1 A |
| 2012/0126545 A1 | | 5/2012 | Ho et al. |
| 2012/0263617 A1 | | 10/2012 | Tinney |
| 2013/0035188 A1 | * | 2/2013 | Yagasaki ............... B60K 6/365 475/5 |
| 2013/0056323 A1 | | 3/2013 | Jakob-Bodenhagen et al. |
| 2014/0333165 A1 | * | 11/2014 | Hikita ............... H02K 3/28 310/71 |

FOREIGN PATENT DOCUMENTS

EP 0295296 A 12/1988
WO 03100946 A 12/2003

OTHER PUBLICATIONS

DE 102011119498 A1 Englsih Translation.*
Mühlemann, Roland; Newman, Paul; SKAI Technology—Compact vehicle power electronics systems; available on The Wayback Machine at http://web.archive.org/web/20110501000000*/http://www.semikron.com/skcompub/en/ SKAI_Technology.pdf at least as early as Oct. 15, 2011.
Semikron; SKAI 90 A2 GD06-W12CI; stating "Rev. 9—Apr. 20, 2011"; available online at http://datasheet.iiic.cc/semikron/SKAI90A2GD06-W12CI.pdf at least as early as Jul. 11, 2013.

* cited by examiner

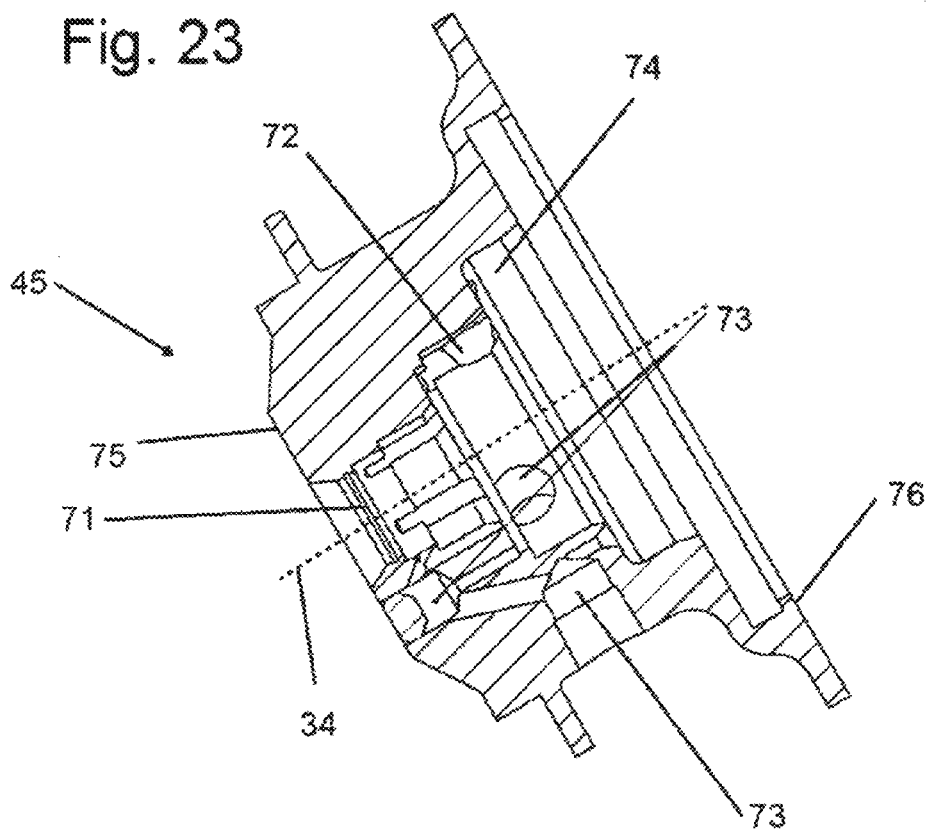
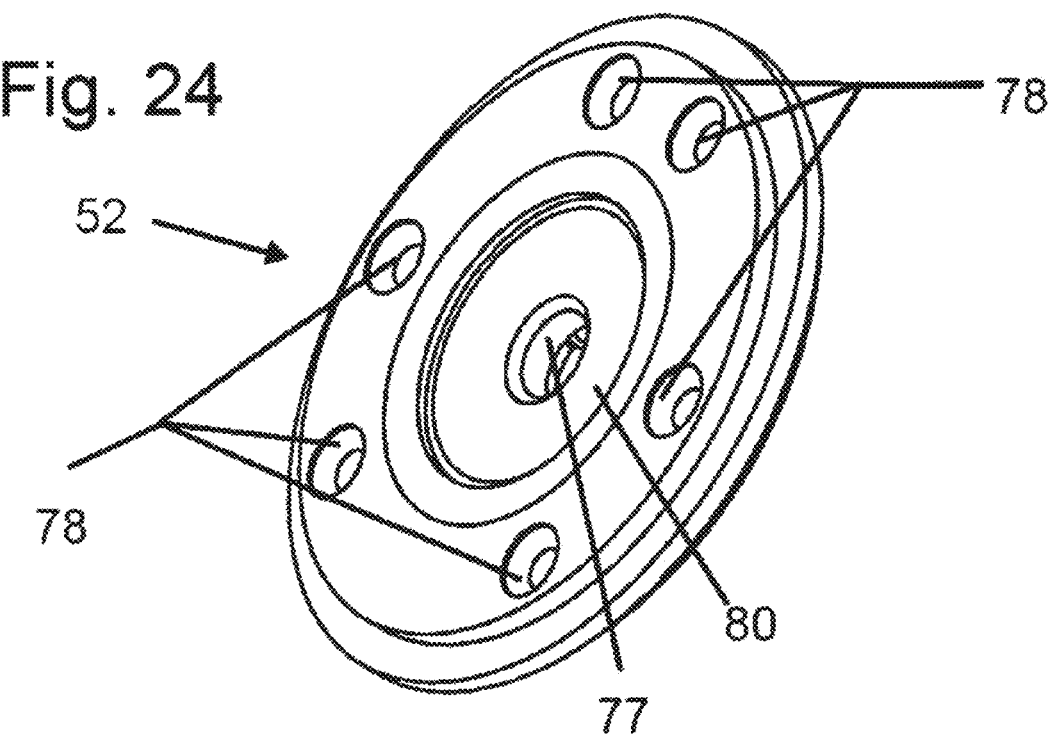

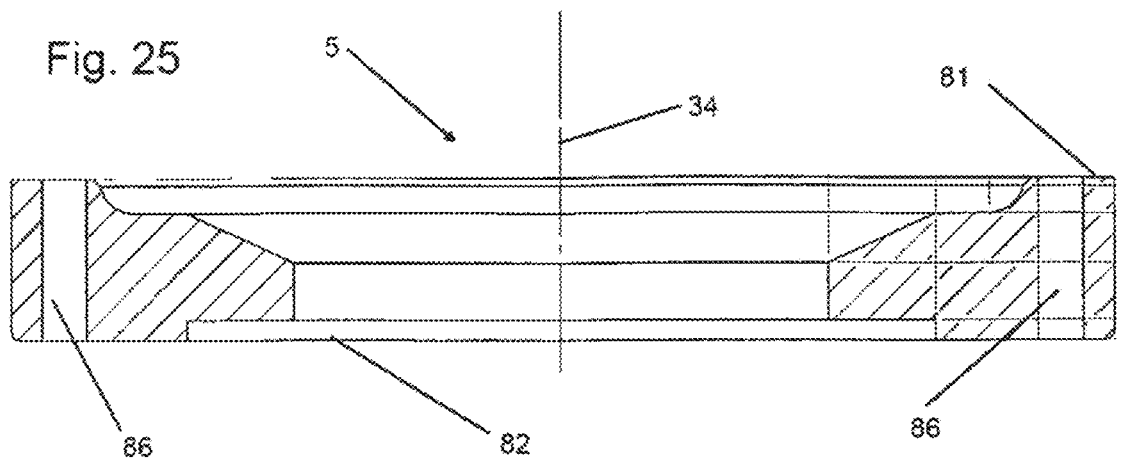
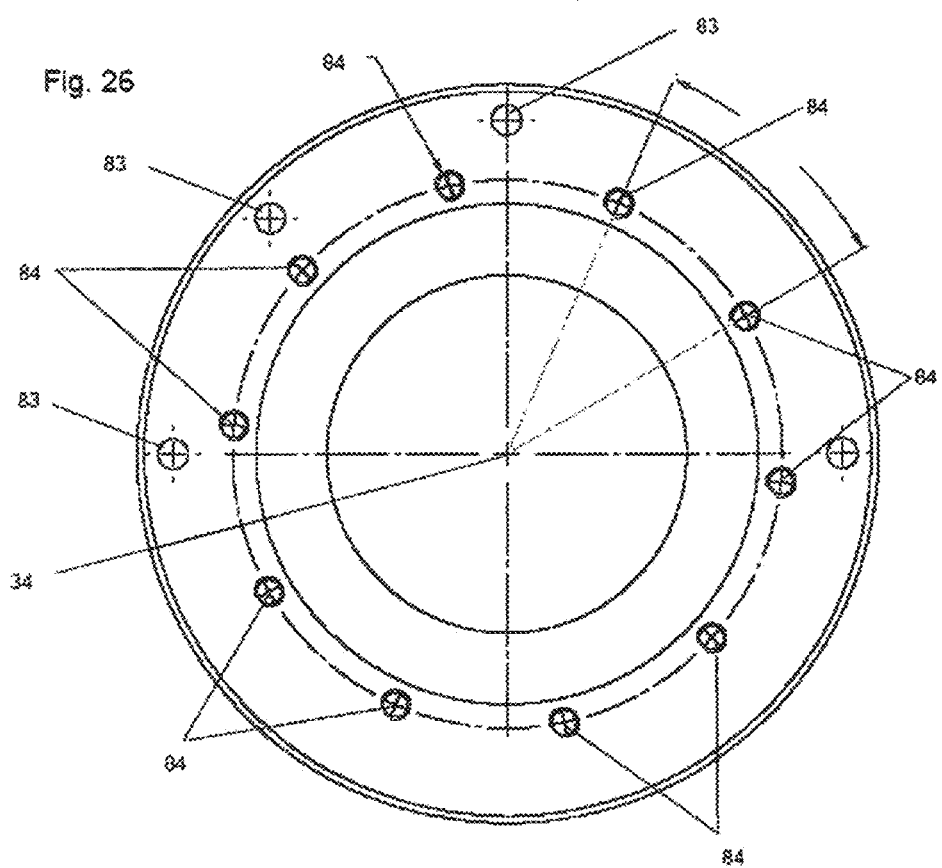

Fig. 27
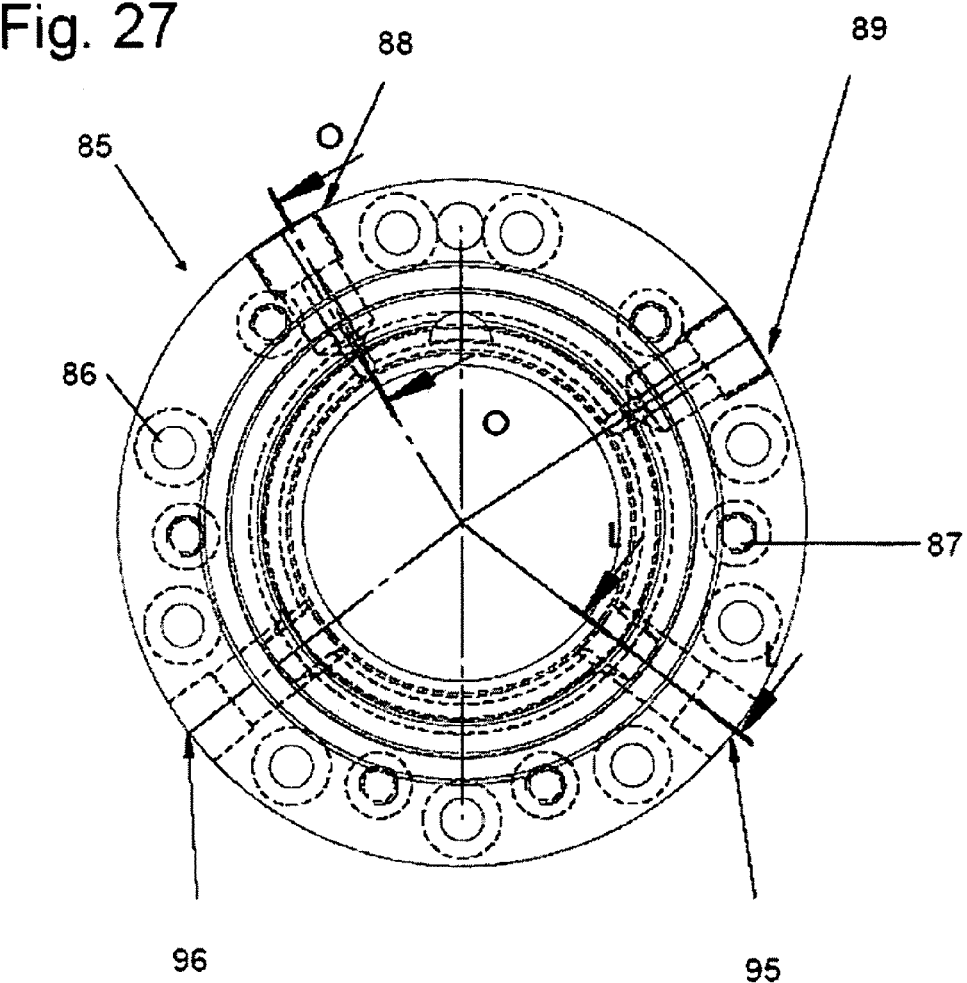
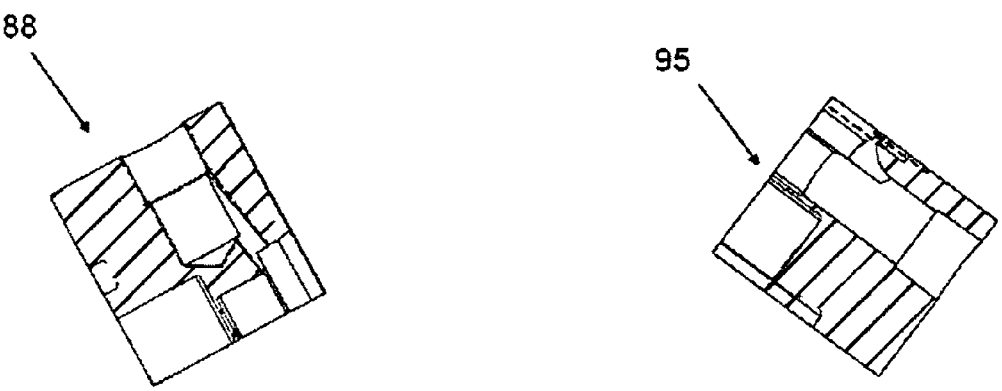
SECTION O-O
SECTION L-L

ENGINE AND INDUCTION GENERATOR

CROSS REFERENCE TO RELATED APPLICATION

This application is a continuation-in-part application of co-pending U.S. patent application Ser. No. 12/931,970, filed on Feb. 15, 2011, which claims benefit to U.S. Provisional Patent Application 61/338,235, filed on Feb. 16, 2010, the disclosures of which are hereby incorporated by reference.

BACKGROUND OF THE INVENTION

1. Field of the Invention

The present invention pertains to an engine. More particularly, the present invention pertains to an engine positioned within the stator of an induction generator.

2. Description of the Prior Art

The present invention relates to engines, and in particular to internal combustion engines surrounded by an induction generator.

It is well-known in the prior art to provide a generator having a rotor and a stator positioned around an internal combustion engine, and whereby the internal combustion engine rotates the rotor, which in turn generates electricity. U.S. Pat. No. 688,494 to Stern discloses such a device.

U.S. Pat. No. 6,230,670 to Russell discloses a similar device, only in which the internal combustion engine forms part of the rotor, and the stator is the outer portion of the device, rather than the inner portion.

However, devices like those described in Stern and Russell are nothing more than generators that convert mechanical energy into electricity.

The present invention seeks to improve upon the prior art by providing a number of advantages. For instance, the present invention has an induction generator that is capable of converting both mechanical energy into electricity, and electricity into mechanical energy. In one embodiment, the present invention includes a mechanical output shaft that is selectively engaged with the crankshaft from the engine, the induction rotor, and a drive shaft to a vehicle. The crankshaft can selectively provide power to the induction rotor and/or the drive shaft, the induction rotor can selectively provide power from the crankshaft or to/from the drive shaft, and the drive shaft can selectively provide power from the crankshaft or to/from the induction rotor.

SUMMARY OF THE INVENTION

In one regard, this application relates to an improved system of creating rotational power from liquid and/or gas fuel by way of a single rotational axis along which compressor and turbine portions rotate. More particularly, this application relates to an improved engine that locates the rotating assemblies along a common axis.

The embodiment of this disclosure provides an improved power-plant, of a hybrid nature, utilizing a rotary engine to create a unique mechanism with superior performance characteristics with regard to brake specific fuel consumption, horsepower per liter, horsepower per pound, (of engine weight), as well as reducing emissions output ($CO_2$/kW). This engine is an excellent fit for hybrid-electric applications due to its improved efficiency, smaller packaging area, significantly reduced weight, and integrated electromotive and "regenerative braking" capabilities, when compared to today's traditional internal combustion engines (ICE). This power-plant can also be used in traditional motor vehicles, marine conveyances, aviation conveyances, and autonomous power generation units. This device is utilized wherever converting potential energy, such as gasoline or diesel, to kinetic-rotational power, electrical power, or a combination of electrical and kinetic energy is utilized and created. Furthermore, this power-plant can be produced in a variety of scale sizes, including a small scale, suitable for unmanned aerial vehicles and micro power generators, to large scale marine vessel power plants and "off grid" electrical power generation units. The disclosure is easily scalable in size and power to these different applications. Future vehicles could be designed around this much more compact and efficient configuration.

One embodiment of this invention discloses a power-plant, or engine, that places all rotating assemblies along a common axis. In addition, the present application discloses a power-plant, or engine, that places all rotating assemblies along a common axis and within a common assembly housing. This novel product reduces heat loss and mechanical complexity and thus increases thermal efficiency with regard to both the turbine efficiency and internal combustion efficiency.

In another embodiment, a rotary engine, similar to the Wankel engine, be it single or multiple rotaries, will be set on either side by one half or the other of the turbocharger, all residing within a common housing assembly, and along a single axis of rotation. The rotary engine can be designed to operate either with or without a turbocharger. The turbocharger is traditionally an auxiliary piece of equipment which uses the engine's exhaust gases to pass through its turbine which is coupled to an air compressor. A mechanical shaft is housed within the engine's crankshaft along a single axis of rotation and couples the turbine to the air compressor. In one embodiment, this mechanical shaft, or compressor-turbine shaft, rotates independently from the engine's crankshaft as the compressor-turbine shaft is uncoupled, or unconnected, to the crankshaft. As engine speed increases, and subsequently exhaust gas flow increases, the compressor's rotational velocity increases, and there is an increase in the volume and density of the air supplied to the engine. Extra fuel is added to compensate for the increase in available oxygen produced within the combustion chamber. Finally, increased fuel and air charge are then burned and dispelled through the exhaust port and into the turbine, thus continuing and encouraging the cycle.

The addition of the turbocharger to the rotary-style internal combustion engine increases the engine's specific power output and efficiency (engine efficiency defined as Brake Specific Fuel Consumption or "BSFC" for the purpose of this disclosure). Additionally, another advantage of one embodiment of this disclosure is the rotor combustion chamber, which allows for flexibility in fuel choices from the use of standard automotive gasoline or diesel fuel, to alternative fuels such as natural gas, methanol, propane, etc.

The scope of the present invention is defined solely by the appended claims, and is not affected to any degree by the statements within this summary. Briefly stated, one embodiment of the present invention is a rotary-style internal combustion power-plant with a compressor, a combustion rotor, a power take-off housing, and a turbine. In another embodiment, the present invention includes a rotary-style internal combustion power-plant, with a compressor housing, wherein a compressor is housed, an electric machine housing, located adjacent to the compressor housing, wherein an electric machine (generator/drive motor) is housed, a charge air cooler housing, located adjacent to the electric machine housing, a combustion rotor housing located adjacent to the charge air cooler housing, a power take-off housing located adjacent to the combustion rotor housing, a combustion rotor located adjacent to a power take-off housing, an auxiliary pump housing (oil and coolant) located adjacent to the combustion rotor, and a turbine located adjacent to the auxiliary pump housing (oil and coolant), wherein the housings are manufactured as separate entities and are stacked and assembled along a single axis.

In yet another embodiment, there is provided an internal combustion power-plant, comprising:

a) a combustion rotor housing having a combustion chamber bore and a common axis of rotation, a combustion rotor having a combustion rotor axis, and a crankshaft having a lobe, an aperture, and a crankshaft axis, the lobe having a lobe axis spaced from the crankshaft axis, wherein the common axis and the crankshaft axis are co-axial, and the combustion rotor axis and the lobe axis are co-axial;

b) a compressor-turbine shaft having a first end and a second end, the compressor-turbine shaft being co-axial with the common axis and located within the aperture of the crankshaft, the crankshaft and compressor-turbine shaft are unconnected and rotate independently;

c) a compressor wheel located at the first end of the compressor-turbine shaft, the compressor wheel having a plurality of compressor fins;

d) a turbine wheel located at the second end of the compressor-turbine shaft, the turbine wheel having a plurality of turbine fins; and e) an induction generator positioned around the combustion rotor housing, the induction generator including a stator and an induction rotor, the induction rotor rotating about the stator, the induction rotor being mechanically coupled to the crankshaft, and the stator being electrically connected to a power electronics.

In another embodiment, there is provided an internal combustion power-plant, comprising:

a) a combustion rotor housing having a combustion chamber bore and a common axis of rotation, a combustion rotor having a combustion rotor axis, and a crankshaft having a lobe, an aperture, and a crankshaft axis, the lobe having a lobe axis spaced from the crankshaft axis, wherein the common axis and the crankshaft axis are co-axial, and the combustion rotor axis and the lobe axis are co-axial; and b) an induction generator positioned around the combustion housing, the induction generator including a stator and an induction rotor, the induction rotor rotating about the stator, the induction rotor being mechanically coupled to the crankshaft, and the stator being electrically connected to a power electronics.

In another embodiment hereof, there is provided an internal combustion power-plant, comprising:

a) a combustion housing having a crankshaft that is driven when a fuel is combusted in the combustion housing; and b) an induction generator positioned around the combustion housing, the induction generator including a stator and an induction rotor, the induction rotor rotating about the stator, the induction rotor being mechanically coupled to the crankshaft, and the stator being electrically connected to a power electronics.

For a more complete understanding of the present invention, reference is made to the following detailed description and accompanying drawings. In the drawings, like reference characters refer to like parts throughout the views in which:

BRIEF DESCRIPTION OF THE DRAWINGS

FIG. 23 shows a cross-section view of the turbine housing flange;

FIG. 24 shows an isomeric view of the compressor flange;

FIG. 25 shows cross-sectional view of the power take off housing;

FIG. 26 shows front view of the power take off housing;

FIG. 27 shows a cross-sectional view of the compressor "cold side" bearing retainer;

DETAILED DESCRIPTION OF THE PREFERRED EMBODIMENT

Figure 1:
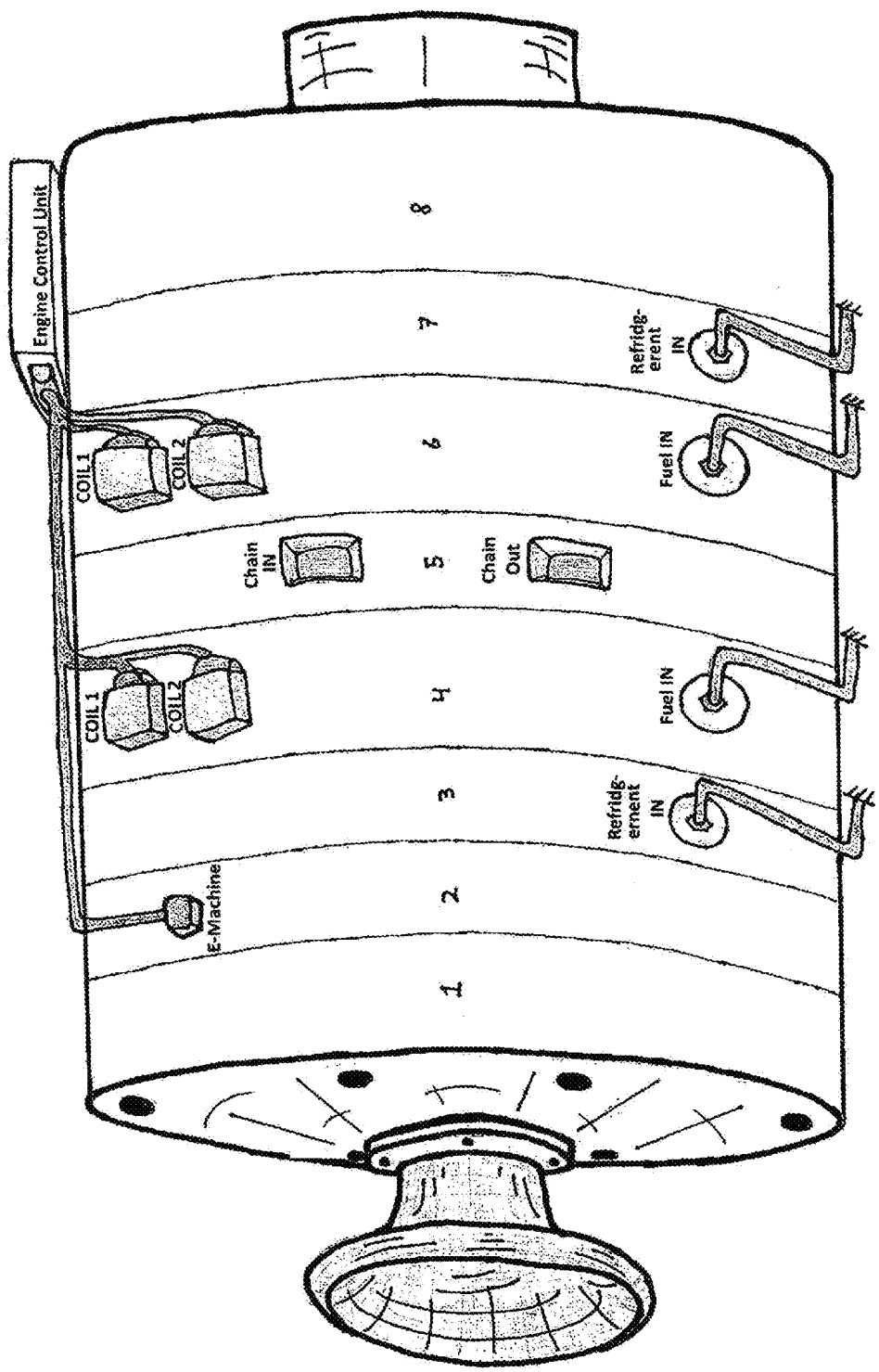
FIG. 1 shows an elevated view of one embodiment of a co-axial turbo rotary engine.
Figure 2:
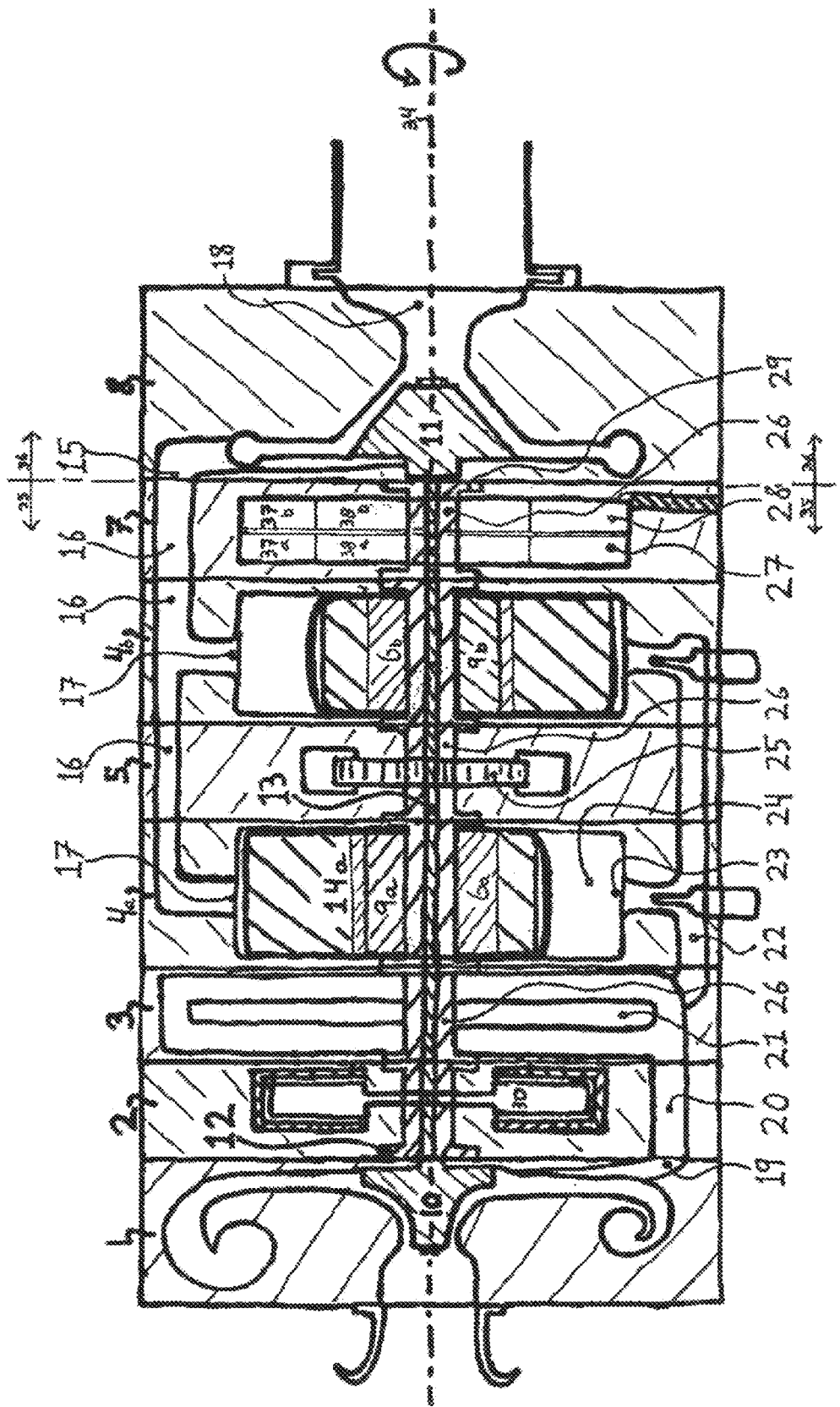
FIG. 2 shows an elevated cross-sectional view of one embodiment of a co-axial rotary engine.

One embodiment of the present disclosure provides an improved system of creating rotational power from liquid and/or gas fuel via a single rotational axis along which compressor and turbine portions rotate. In one embodiment, illustrated in FIGS. 1 and 2, a version of the co-axial rotary engine is depicted that may be found, for example, in a hybrid automobile. It incorporates multiple and separate "stackable" housings (1-8) which, when assembled, complete the engine. This design also allows for each of the housings to be manufactured separately, then stacked together to create varying sizes and layouts. However, in an alternative embodiment, each "housing" is incorporated into a single housing assembly. FIG. 2 shows the compressor housing 1, located adjacent to the electric machine housing 2; the electric machine housing 2 located adjacent to the charge air cooler housing 3; the charge air cooler housing 3 located adjacent to the combustion rotor housing 4a; the combustion rotor housing 4a located adjacent to the power take-off housing 5; the power take-off housing 5 located adjacent to the combustion rotor housing 4b; the combustion rotor housing 4b located adjacent to the auxiliary pump housing (oil and coolant) 7; the auxiliary pump housing (oil and coolant) 7 located adjacent to the turbine housing 8. In the embodiments shown in FIGS. 1, 2, and 3, the housings share a single common axis, and a single crankshaft 12, or driven shaft 26.

In another embodiment, the compressor housing 1 includes a compressor wheel 10, which has a plurality of compressor fins 39 that extend outwardly in the radial direction of the compressor-turbine shaft 13. The compressor wheel 10 is fastened to the compressor-turbine shaft 13, at the first end 49, via a fastener, such as a threaded coupling, or a press-fit. One embodiment includes a nut, as the compressor-turbine shaft is partially threaded. However, as one skilled in the art will recognize, multiple types of fasteners, or fastening methods, can be employed, such as a threaded nut bolt type assembly. In addition, as one skilled in the art will recognize, it is also possible that the compressor wheel 10 and compressor-turbine shaft 13 can be manufactured from a single piece of material or billet. The other end, or second end 50, of the compressor-turbine shaft 13 is connected to the turbine wheel 11. The turbine wheel 11 is fastened to the compressor-turbine shaft 13 via a fastener, such as a threaded coupling. However, as one skilled in the art will recognize, multiple types of fasteners, or fastening methods, can be employed, such as a threaded nut bolt type assembly, or a mechanical press-fit, or welding. Additionally, as one skilled in the art will recognize, it is also possible that the turbine wheel 11 and compressor-turbine shaft 13 can be manufactured from a single piece of material or billet. When the turbine wheel 11 rotates due to the expulsion of the exhaust gases from the combustion process within the combustion rotor housing 4, the compressor wheel 10 rotates accordingly. Exhaust gases are passed from the exhaust port(s) 17 in the combustion rotor housing(s) 4 and through a common exhaust passage or manifold 16, through the turbine input port 15, until finally discharged from the turbine housing 8, through the output port 18. The compressor housing 1 can be made from a multitude of materials including, but not limited to: ceramic, composite, ceramic composite matrix, carbon fiber laminate, aluminum alloys including 6000-8000 series aluminum, or magnesium.

In one embodiment, the electric machine housing 2 includes a standard automotive type electric machine including a rotor, or armature 30, and a stator, or field 29, of either A/C or D/C designs, (determined by the application of the engine). Some traditional types of A/C designs include a "permanent magnet" (PM) or an "AC induction." Some embodiments include DV designs and are either brushed D/C motors, or brushless D/C motors. Regardless of the electric machine type or design, the components of the electric machine are coaxially located on axis 34 with and coupled to the crankshaft 12. The electric machine can be used in various scenarios or "power modes." One example includes utilizing the electric machine for starting the engine, after which the combustion rotor process is utilized to drive the electric machine to generate electrical power, for auxiliary processes. Such processes include providing electricity to power various pumps and fans. Another power mode, "E-Boost" occurs when the electric machine is used to drive the eccentric shaft in addition to, or in concert with, the combustion rotor process. This creates addition rotational power. One example of this useful mode is in a UAV or aviation application during takeoff or in any application where a rapid rate of acceleration is needed. One other power mode is the "electric only" mode, where the electric machine provides the rotational movement. This is utilized when either silent drive or fuel conservation is required. In this mode, a compression relief valve is employed in the combustion rotor housing 4 to reduce the pumping losses from the rotary combustion bore 24. The electric machine may also be employed to aid the balance or vibrational characteristics of the engine. During this process, varied loads would be applied and removed to the electric machine in order to dampen power pulses from the combustion process, in this situation the electric machine would be essentially taking the place of the traditional "counterbalance" found on many traditional rotary "Wankel" engines. The electric machine housing 2 can be made from a multitude of materials including, but not limited to: ceramic, composite, ceramic composite matrix, carbon fiber laminate, aluminum alloys including 6000-8000 series aluminum, or magnesium.

In one embodiment, the charge air cooler housing 3 routes the compressed intake air from the compressor output port 19 through an intake charge passageway 20, then through a corrugated aluminum fin tube block heat exchanger 21. A corrugated aluminum fin tube block heat exchanger 21 cools the compressed air via coolant traveling through the aluminum block 21. The fins are intended to guide the compressed air through the block 21, while decreasing the air charge temperature supplied to the engine. The corrugated aluminum fin tube block heat exchanger 21 carries coolant provided by the coolant pump 28 within the coolant pump housing 7, through an external heat exchanger (not shown) then into the aluminum fin tube block heat exchanger 21. The coolant is then returned to the coolant pump 28 via internal passageways and journals through the necessary housings, further cooling other components as needed. The cooled compressed air charge is then passed along the internal intake charge passage way 22 until it is delivered to the combustion rotor bore(s) 24. The charge air cooler housing 3 can be made from a multitude of materials including, but not limited to: ceramic, composite, ceramic composite matrix, carbon fiber laminate, aluminum alloys including 6000-8000 series aluminum, or magnesium.

In one embodiment, the combustion rotor housing 4 is provided with a rotary internal combustion engine. This design uses a three sided rotor similar in shape to a Reuleaux triangle. The combustion rotor 14 rotates about an eccentric crankshaft 12 with a circular lobe 9 which propels an eccentric bearing. The lobe 9 is provided with a lobe axis 106, and the lobe axis 106 is off-set from axis 34. During operation the lobe axis 106 rotates about axis 34. Pressure is converted from within the combustion rotor bore 24, located within the combustion rotor housing 4 into rotational motion about the common axis 34 of rotation, through the crankshaft 12. The inside surface of the combustion rotor housing 4, referred to as the combustion rotor bore 24, is the traditional epitrochoid shape. Combustion is initiated within the combustion chamber bore 24, during the cycle of the combustion rotor 14, between the intake port 23 and the exhaust port 17, by way of a conventional sparkplug, or a series of spark plugs. The air fuel mixture is inducted through intake port 23, prior to the combustion process, and expelled through the exhaust port 17 after combustion. In one embodiment, all the necessary intake and exhaust passages are machined into the appropriate housings, requiring only common and proper sealing surfaces and methods between the housings. The injection method of the fuel is dependent on fuel type. Fuel injectors may be located directly outside the intake port(s) 23, outside, and, or, in front of compressor wheel 10. In order to aid fuel atomization and propagate a more homogenous air fuel mixture, the fuel injectors may be located with direct access to the combustion chamber, as is the case in a "direct injection" application. The combustion rotor housing 4 can be made from a multitude of materials including, but not limited to: ceramic, composite, ceramic composite matrix, carbon fiber laminate, aluminum alloys including 6000-8000 series aluminum, or magnesium.

In one embodiment, the power take-off housing 5 includes a sprocket gear 25 fixed to a driven shaft 26 which is co-axially located, in-line with, and coupled to the crankshaft 12 about axis 34. Power is taken from the gear 25 via a chain which is coupled to another gear affixed to the armature of an electric generator in the case of a hybrid automotive application or a transmission in the case of a marine application. The power take-off housing 5 can be made from a multitude of materials including, but not limited to: ceramic, composite, ceramic composite matrix, carbon fiber laminate, aluminum alloys including 6000-8000 series aluminum, or magnesium.

In another embodiment, connection between the power take-off housing 5 and the crankshaft 12 is coupled by way of two gears, and another embodiment the coupling is accomplished by way of a shaft. However, as one skilled in the art recognizes, the connection may be accomplished by other conventional methods, so long as the connection is accomplished.

In one embodiment, the auxiliary pump housing (oil and coolant) 7, houses two common hydraulic gerotor pumps 27 and 28. A gerotor pump consists of an internal drive gear 38a and b, propelled by a driven shaft 26, or crankshaft 12. The gerotor pump(s) internal drive gear 38a and 38b in turn drive the idler gear 37a and 37b, which creates a pressure differential necessary to pump fluid. The oil pump 27 is located closer to the combustion rotor housing 4, and the coolant pump 28 is located closer the turbine housing 8. Ports are located internal to the auxiliary pump housing 7 which allow the flow and return of the fluids, thus simplifying the engine by reducing the number of lines and hoses, fittings etc. In addition, this embodiment utilizes standard face seals between housings. External ports may be required to allow flow of fluids to and from external heat exchangers. It is also possible, depending on the application, that external heat exchangers would not be required. Particularly, if the application allows sufficient airflow across the surface of the engine. Cooling fins could be incorporated into the outside periphery of the engine on many housings, as they are in many traditional "air-cooled" engines.

The auxiliary pump housing (oil and coolant) 7 can be made from a multitude of materials including, but not limited to: ceramic, composite, ceramic composite matrix, carbon fiber laminate, aluminum alloys including 6000-8000 series aluminum, magnesium, steel alloys such as titanium and Inconel®, or cast iron.

In one embodiment, the turbine housing 8 includes the turbine wheel 11, which rotates due to the expulsion of the exhaust gasses from the combustion process within the combustion rotor housing 4, or 4a and 4b, as the case may be. The turbine wheel 11 is attached to a compressor-turbine shaft 13 by a fastener, such as a threaded coupling. However, as one skilled in the art will recognize, multiple types of fasteners can be employed, such as a threaded nut bolt type assembly, or the shaft may be mechanically coupled to the turbine wheel 11. The compressor turbine shaft 13 is coaxially located within the center of the driven shafts 26, or crankshaft 12. The compressor wheel 10 rotates accordingly. Exhaust gasses are passed from the exhaust port(s) 17 in the combustion rotor housing(s) 4 and through a common exhaust passage 16, through the turbine input port 15, across the turbine wheel 11, until finally discharged from the turbine housing 8, through the output port 18. The turbine wheel 11 has a plurality of turbine fins 40 which are extended outwardly in the radial direction of the compressor-turbine shaft 13. The compressor-turbine shaft 13 is supported internally within the crank/drive shaft 12 by a series of bearings 33, which are internally lubricated via internal passage ways and journals 41 by engine oil provided by the oil pump 27. The turbine housing 8, can be made from a multitude of materials including, but not limited to: ceramic, composite, ceramic composite matrix, carbon fiber laminate, aluminum alloys including 6000-8000 series aluminum, magnesium, steel alloys such as titanium and Inconel®, or cast iron.

Figure 3:
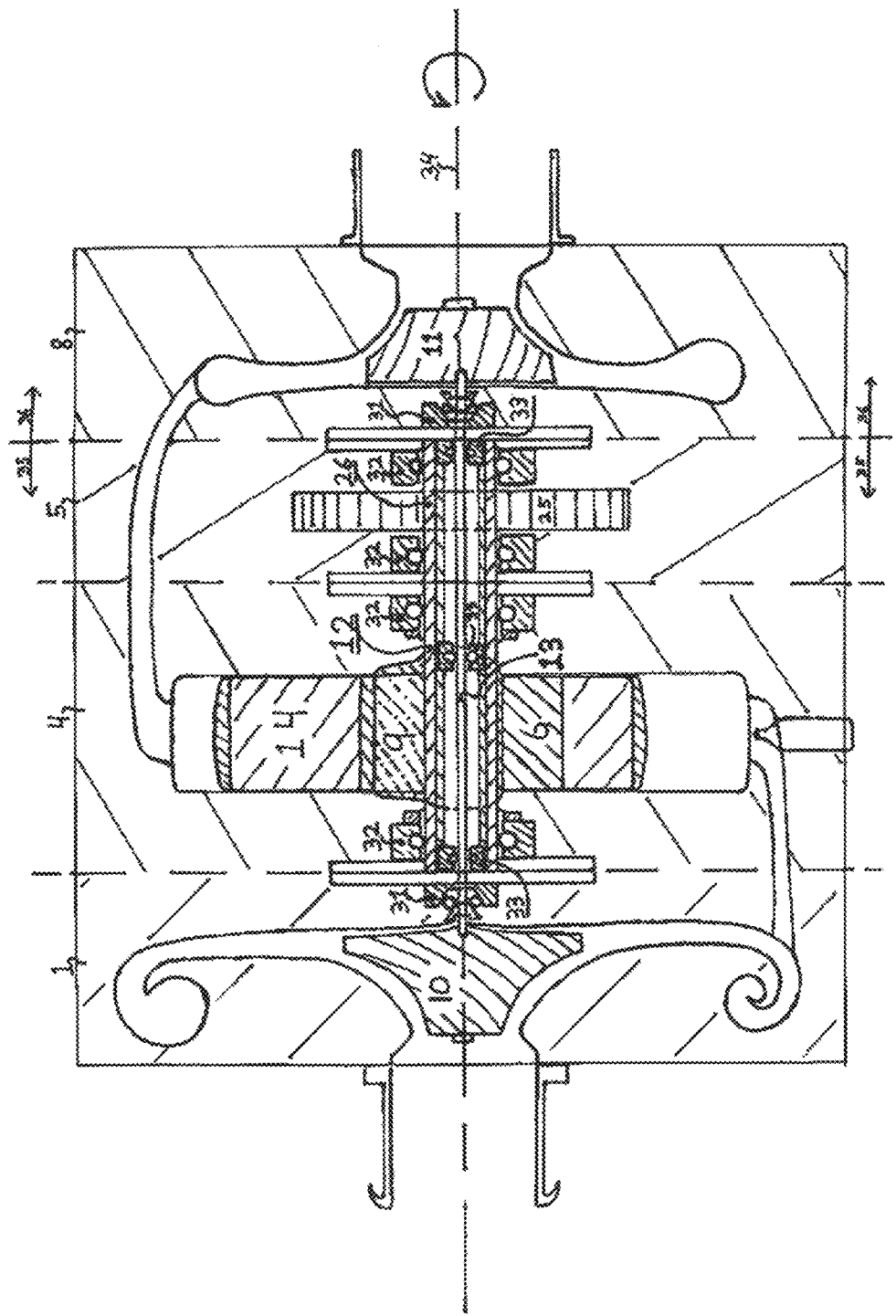
FIG. 3 shows an enlarged elevated cross-sectional view of one embodiment of a co-axial rotary engine.

Another embodiment of the engine is depicted in a cross-sectional view in FIG. 3. FIG. 3, shows the compressor housing 1 located adjacent to the combustion rotor housing 4; the combustion rotor housing 4 located adjacent to the power take-off housing 5; the power take-off housing 5 located adjacent to the turbine 8. As shown in FIG. 3, a compressor wheel 10, a combustion rotor 14, and a turbine wheel 11 are all co-axially arranged. This creates a compact power-plant suitable for a plethora of applications including use in an automobile, motorcycle, truck, bus, or other moveable conveyance, as well as a generator. The engine's crankshaft 12 shares the axis 34, as well as the compressor-turbine shaft 13. The crankshaft lobe 9 is propelled by the eccentric bearing 6 and produces the rotors 14 elliptical path about the same common rotational axis 34, via combustion within the combustion chamber bore 24. Bearings 33 are employed within the crankshaft 12 to support the compressor-turbine shaft 13. Thrust bearings 32 are employed at either end of the crank shaft 12, within the combustion rotor housing 4. Thrust bearings 32 are also employed to support the driven shaft 26 within the power take off housing 5. Bearing packs 31 are employed at either end of the compressor-turbine shaft 13, within the compressor housing 1, and turbine housing 8. The bearing packs 31 support the compressor-turbine shaft 13, as well as provide oil to the internal bearings 33 via internal oil journals.

In another embodiment, all the essential operation assemblies are located co-axially. In yet another embodiment, the auxiliary components of the power-plant are located co-axially; this includes an electric machine housing 2, an intake charge air cooler housing 3, power take off housing 5, an oil pump 27, and coolant pump 28.

In yet another embodiment, all essential and auxiliary components operate along a common axis 34 and are arranged in a specific order so that the compressor or inlet side of the engine 35 is the "cold side." This is achieved by locating both the charge air cooler housing 3, and electric machine housing 2, or starter-generator housing 2, nearest to the compressor housing 1 portion of the engine thus ensuring a denser more efficient air charge supplied to the cylinders. This improves overall engine operating efficiency. In another embodiment, all essential and auxiliary components operate along a common rotation axis 34, are arranged in a specific order so that the compressor or inlet side of the engine is the "cold side" 35 of the engine, and conversely the turbine side of the engine is the "hot side" 36 of the engine. Therefore, the "hot side" of the engine is the side nearer to the turbine. The turbine's efficiency is improved as the waste heat from the combustion and frictional processes of the engine are more efficiently contained within the turbine housing. The positioning of the oil 27 and coolant 28 pumps adjacent to the turbine creates a boundary layer between the turbine and the nearest combustion chamber. Furthermore, any waste heat created by the auxiliary pump housing (oil and coolant) 7 improves the operation efficiency of the turbine.

One embodiment of the power-plant is for use as an electrical power generator. In this embodiment, the power plant is a "steady state" or a low RPM variation (revolutions-per-minute) embodiment. Power output is required to power a hybrid gas/electric automobile, as well as certain marine and aviation applications. One object of the present disclosure is to meet the specific need for improved brake specific fuel consumption, while at the same time improving emissions output in terms of $CO_2/kW$, by creating an engine designed specifically to run on a multitude of conventional and alternative fuels.

Figure 6:
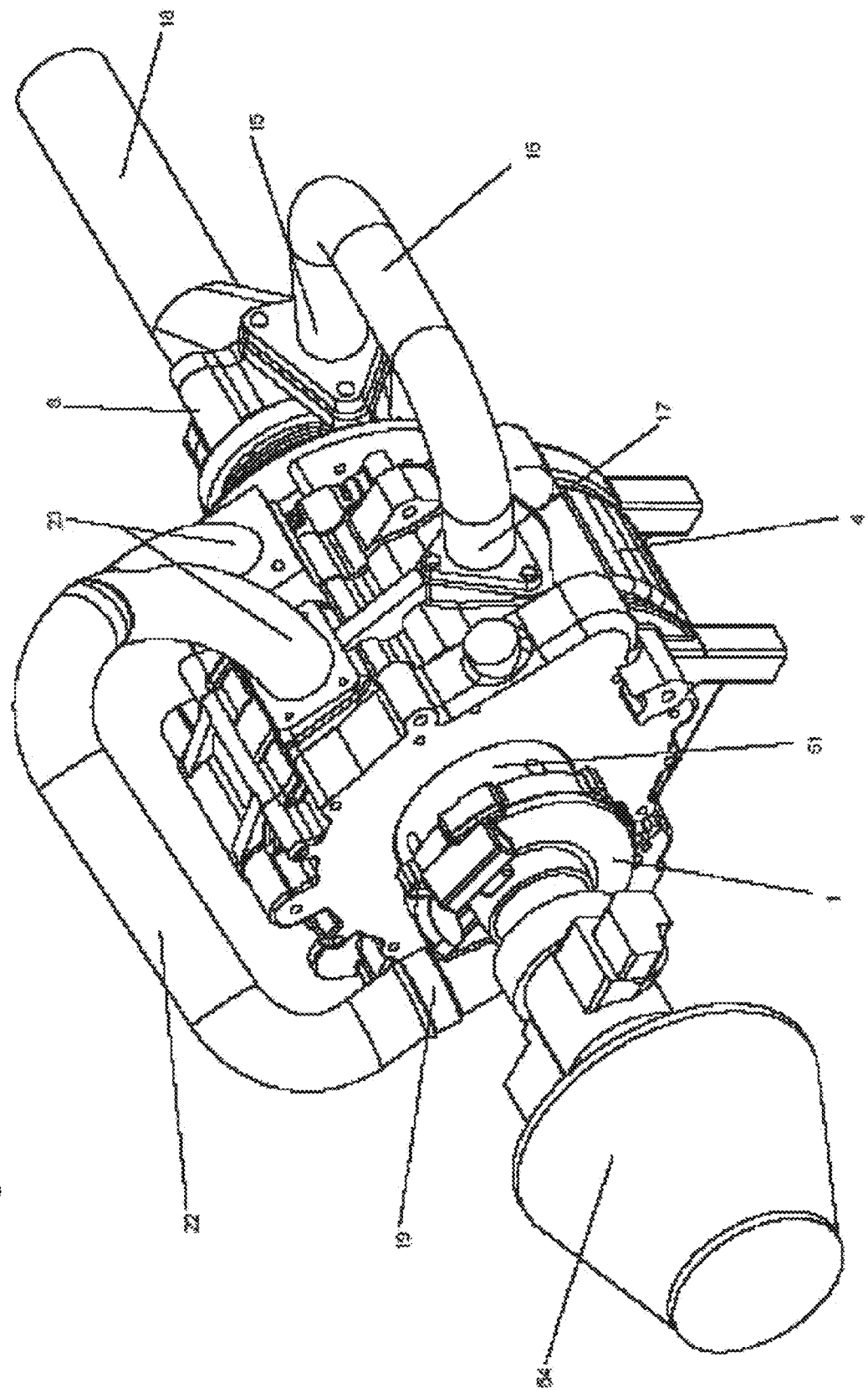
FIG. 6 shows an isomeric view of an embodiment of the co-axial turbo rotary engine.

FIG. 6 shows a perspective view of one embodiment of the engine assembly. As shown therein, the combustion rotor housing 4 is located between the compressor housing 1 and the turbine housing 8. The turbine housing 8 includes a turbine-input port 15 that connects the turbine housing 8 to the exhaust port 17 of the combustion rotor housing 4, by way of an exhaust passage 16. The compressor housing 1 includes a compressor output port 19, and the combustion rotor housing 4 includes intake ports 23. The compressor output port 19 and the intake ports 23 are connected by way of the intake charge passageway 22. The intake body 54 is located adjacent to the compressor housing 1 and provides air required for combustion. During operation, fuel is mixed with the compressed air generated in the compressor housing 1. The air-fuel mixture is forced through the intake charge passageway 22 and into the combustion rotor housing 4 by way of the intake port 23. After combustion occurs within the combustion rotor housing 4, the exhaust gases are passed from the exhaust port 17 of the combustion rotor housing 4, through the exhaust passage 16 and into the turbine input port 15 of the turbine housing 8. These exhaust gasses are then discharged from the turbine housing 8 by way of the output port 18.

Figure 7:
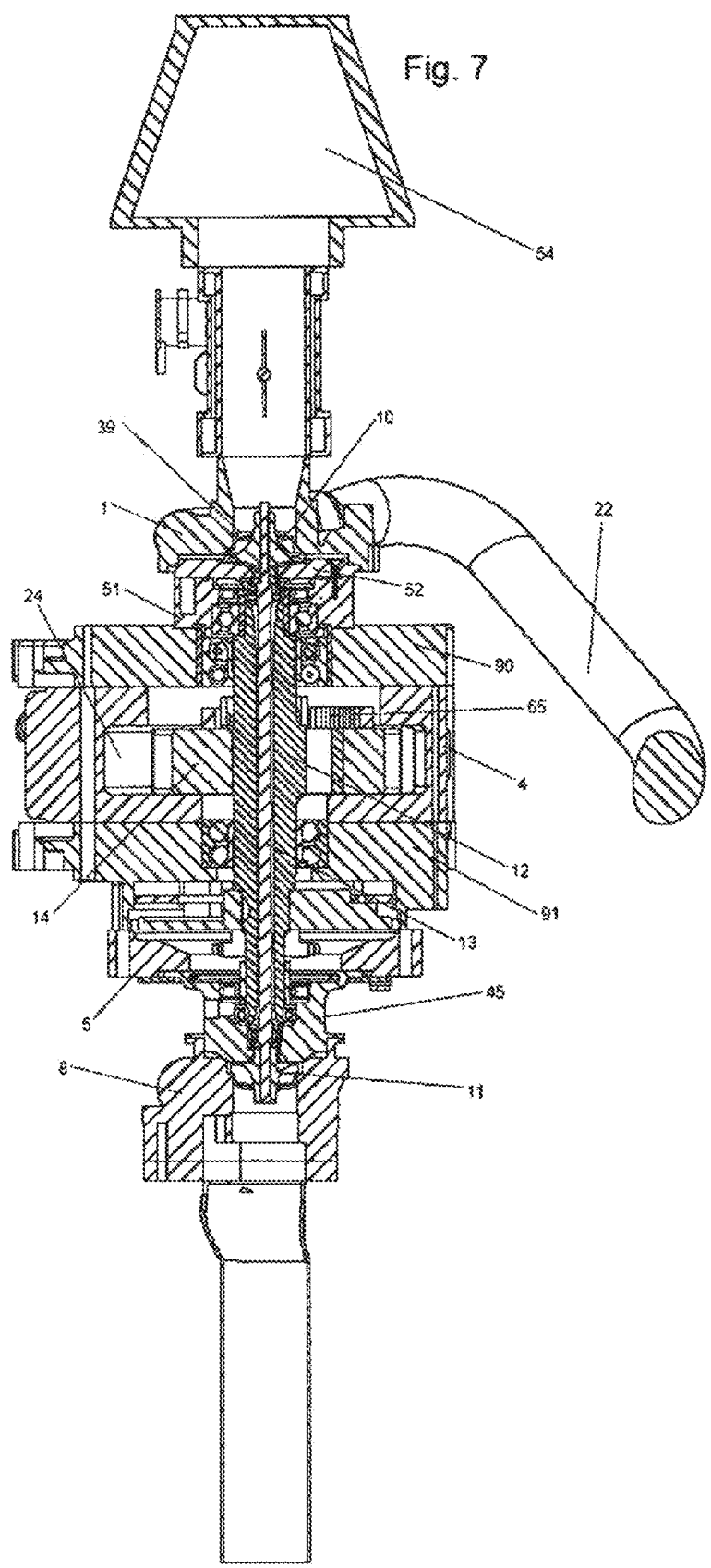
FIG. 7 shows a cross-sectional view of an embodiment of the co-axial turbo rotary engine.

FIG. 7 shows a cross-section view of the engine assembly shown in FIG. 6. As shown therein, the compressor wheel 10 is located on, and mechanically connected to, the compressor-turbine shaft 13. The compressor wheel 10 is provided with compressor fins 39 that extend radially outwardly from the axis 34. The compressor wheel 10 is located within the compressor housing 1. The compressor wheel 10 is located on axis 34 which is common with the compressor-turbine shaft 13. The compressor-turbine shaft 13 extends from the compressor housing 1, through the combustion rotor housing 4 to locate the turbine wheel 11 in the turbine housing 8. The turbine wheel 11 is provided with turbine fins 40 which extend radially outwardly from the axis 34. The turbine wheel 11 and the compressor wheel 10 are spaced apart from one another and located on the compressor-turbine shaft 13. The turbine shaft 13, the compressor wheel 10, and the turbine wheel 11 all rotate in unison about the same axis 34. The crankshaft 12 is located within the combustion rotor housing 4, and is positioned to rotate about the axis 34.

The crankshaft 12 is formed as an eccentric shaft and is provided with a crankshaft lobe 9 and a crankshaft aperture 42. The turbine shaft 13 is located, by way of the bearing surfaces 33, within the crankshaft aperture 42, in order to rotate about axis 34. During operation, however, the crankshaft 12 and the turbine shaft 13 are not connected, mechanically or otherwise, and rotate in independent revolutions. In other words, the crankshaft 12 and the compressor-turbine shaft 13 are un-coupled from one another and, therefore, are allowed to independently rotate with respect to one another. This is because, although they may be generally axially aligned, parallel, and angularly aligned with one another, the compressor-turbine shaft 13 and the crankshaft 12 are not connected torsionally, thus they retain their individual independent torsional degree of freedoms (DOF). Accordingly, the compressor-turbine shaft 13 and the crankshaft 12 operate at different and independent revolutions-per-minute.

As shown in FIG. 7, a first cooling port 90 is located adjacent to the combustion rotor housing 4. Located on the other side of the combustion rotor housing 4 is the second cooling port 91. The cooling ports 90,91 are formed to create the combustion chamber bore 24 with the combustion rotor housing 4.

Figure 8:
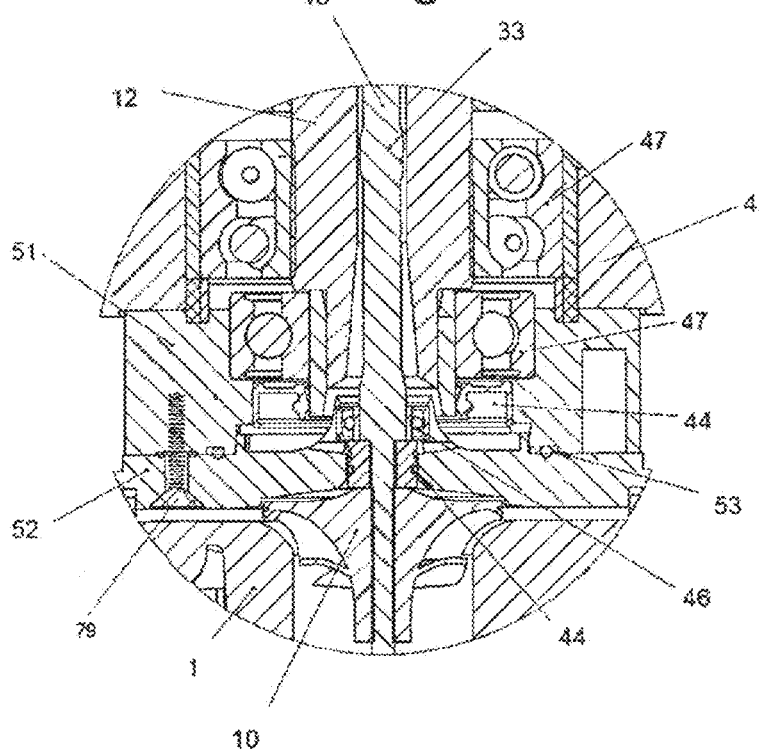
FIG. 8 shows an exploded cross-sectional view of the compressor housing area, or "cold side," of one embodiment of the co-axial turbo rotary engine.

FIG. 8 provides an exploded cross-sectional view of the compressor housing 1 area. The compressor wheel 10 is located, generally, at the first end 49 of the compressor-turbine shaft 13. The compressor wheel 10 is oriented to be located within the compressor housing 1 and is positioned in a coaxial manner with axis 34 and the compressor-turbine shaft 13. Located between the compressor housing 1 and the combustion rotor housing 4 is a turbine retainer 51. A compressor flange 52 is located between the compressor housing 1 and the turbine retainer 51, and an o-ring 53 is located between the compressor flange 52 and the turbine retainer 51. A bearing 46 locates the compressor-turbine shaft 13 within the compressor housing 1, and the turbine retainer 51, as well as on axis 34. There is an oil seal 44 located radially about the compressor-turbine shaft 13 to prevent oil from escaping or leaking. The compressor-turbine shaft 13 includes bearing surfaces 33 which locate the compressor-turbine shaft 13 coaxially with the crankshaft 12. The bearing surfaces 33 provide the only contact between the compressor-turbine shaft 13 and the crankshaft 12 and enable the compressor-turbine shaft 13 and the crankshaft 12 to operate independently, in an un-coupled manner. In other words, the bearing surfaces 33 enable the compressor-turbine shaft 13 to rotate freely with, or without, the crankshaft 12 rotating.

The crankshaft 12 is located on the same axis (axis 34) as the compressor-turbine shaft 13. As shown in FIG. 8, the crankshaft 12 is located within the combustion rotor housing 4 and the turbine retainer 51 by way of bearings 47.

Figure 9:
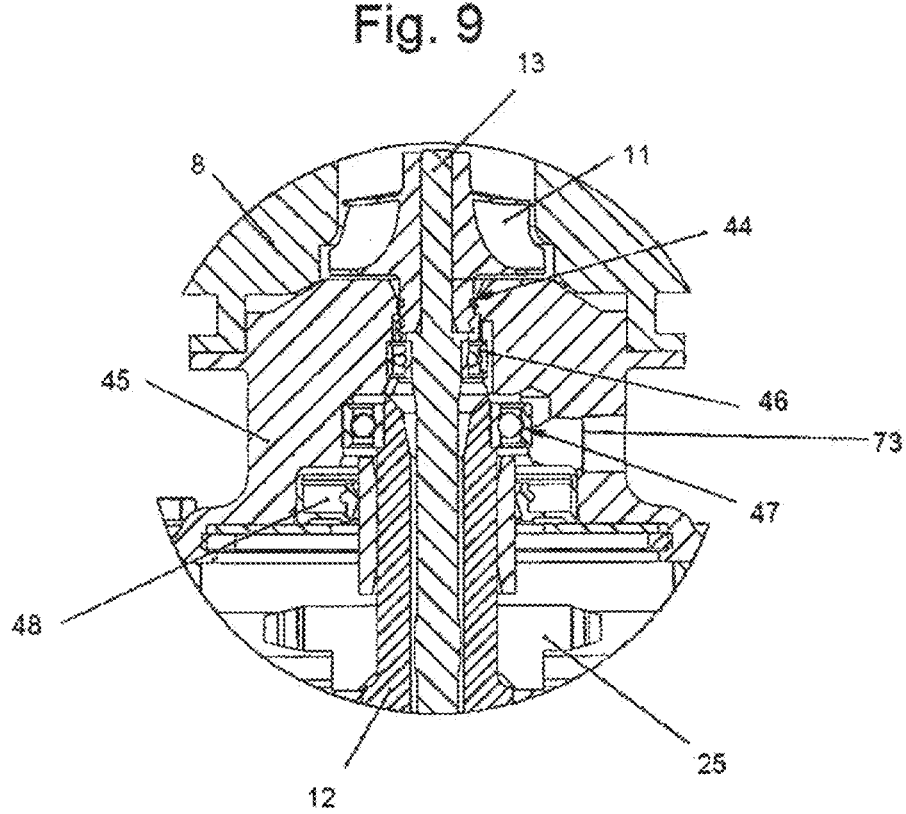
FIG. 9 shows an exploded cross-sectional view of the turbine housing area, or "hot side," of one embodiment of the co-axial turbo rotary engine.

FIG. 9 shows an exploded cross-sectional view of the turbine housing 8 area. As shown therein, the turbine wheel 11 is located coaxially with the compressor-turbine shaft 13. The turbine wheel 11 is located, generally, at one end 50 of the turbine shaft 13 within the turbine housing 8. Located between the turbine housing 8 and the combustion rotor housing 4 is the turbine housing flange 45. Located adjacent to the compressor-turbine shaft 13 and the turbine housing flange 45 is a seal 44. The seal 44 prevents oil from escaping from the turbine housing flange 45. A bearing 46 is located coaxially with the compressor-turbine shaft 13 and is spaced from the end 50 of the compressor-turbine shaft 13. A shaft abutment shoulder, on the compressor-turbine shaft 13, locates the bearing 46 within the turbine housing 8 and the turbine housing flange 45.

Located coaxially with axis 34 and the compressor-turbine shaft 13, the crankshaft 12 includes an aperture 42. Bearing surfaces 33 on the compressor-turbine shaft 13 position the compressor-turbine shaft 13 within the crankshaft 12. A bearing 47 locates the crankshaft 12 within the turbine housing flange 45. Spaced from the end of the crankshaft 12, located coaxially with axis 34, and extending radially from the crankshaft 12, is the sprocket gear 25. In one embodiment, the sprocket gear 25 is coupled to the armature 30 of an electric generator (not shown in FIG. 9), or in another embodiment to a transmission (not shown in FIG. 9). An oil seal 48 is located within the turbine housing flange 45 and is positioned radially around the crankshaft 12 to prevent oil leaking or escaping from the turbine housing flange 45.

Figure 10:
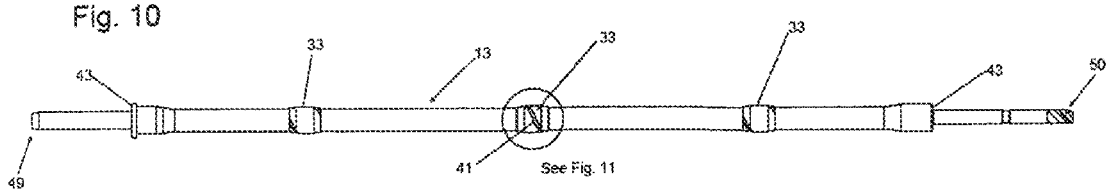
FIG. 10 shows one view of the compressor-turbine shaft.

FIG. 10 shows the compressor-turbine shaft 13 and its bearing surfaces 33. The bearing surfaces 33 may be cut, or formed, to incorporate a groove 41, such as a helix groove, in order to facilitate oil flow along the compressor-turbine shaft 13. The compressor-turbine shaft 13 is provided with bearing shoulders 43 to locate bearings (not shown in FIG. 10) which are employed at either end of the compressor-turbine shaft 13. The bearings 33 locate the compressor-turbine shaft 13 within the compressor housing 1, and turbine housing 8, and provide a bearing to surface to rotate about. The compressor wheel 10 is located adjacent to the first end 49 and the turbine wheel 11 is located adjacent to the second end 50.

Figure 11:
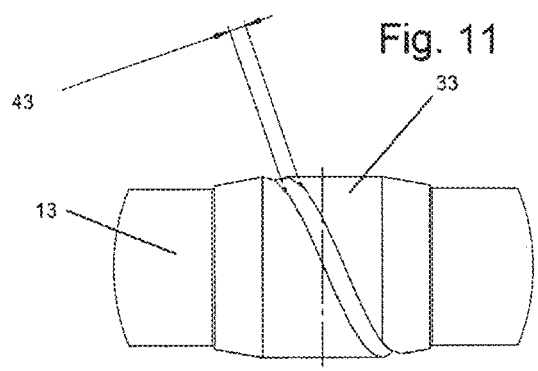
FIG. 11 shows an exploded view of the compressor-turbine bearing surface.

FIG. 11 provides a detail view of a bearing surface 33 on the compressor-turbine shaft 13. As shown therein the groove 41 is located on the bearing surface 33 and enables oil to flow along the axis of the compressor-turbine shaft 13.

Figure 12:
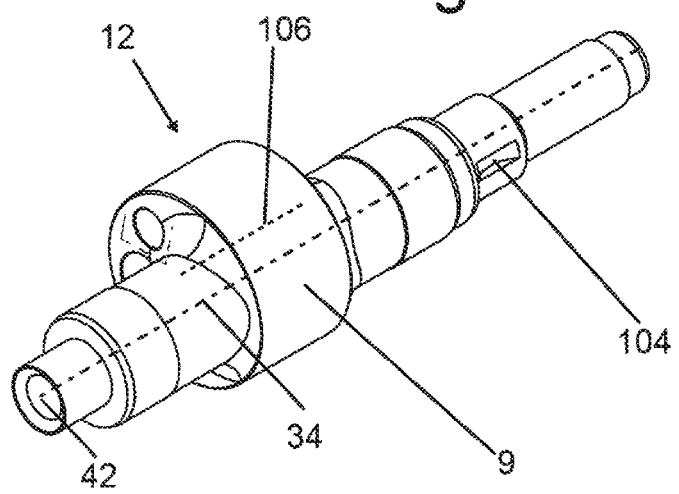
FIG. 12 shows an isomeric view of the crankshaft.
Figure 13:
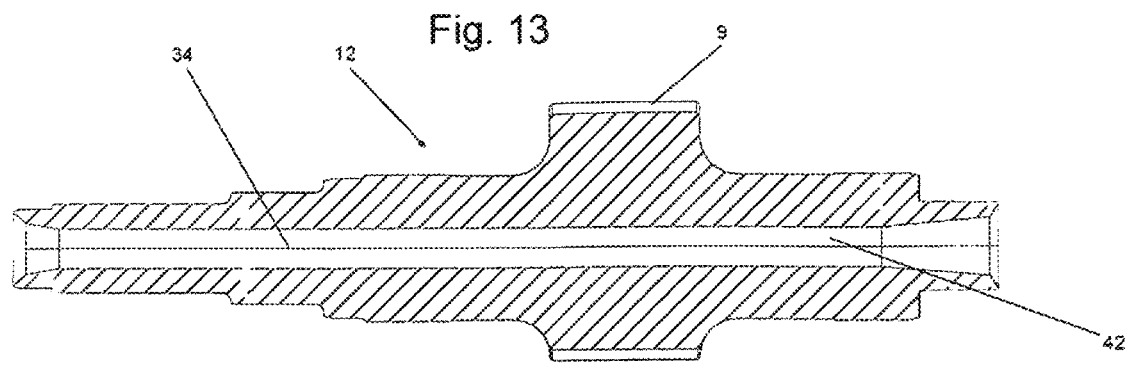
FIG. 13 shows a cross-sectional view of the crankshaft.

The crankshaft 12 in FIG. 12 is formed as an eccentric shaft with a crankshaft lobe 9 and an aperture 42. The lobe 9 is provided with a lobe axis 106; the lobe axis 106 is off-set from axis 34. In operation the lobe axis 106 rotates about axis 34, and the lobe 9 provides the mechanical advantage necessary to create rotational torque from the combustion. As shown in FIG. 13, the aperture 42 includes an axis 34 and allows the compressor-turbine shaft 13 to pass through the crankshaft 12, while remaining completely uncoupled. The crankshaft 12 is positioned within the combustion rotor housing 4 to locate the combustion rotor 14 within the combustion chamber bore 24, as shown in FIG. 7. In operation, the combustion rotor 14 rotates about the axis 106. The aperture 42 is formed to include at least one bearing surface to locate the compressor-turbine shaft 13 on the axis 34, and cooperates with the bearing surfaces 33 of the compressor-turbine shaft 13. This allows the compressor-turbine shaft 13 to operate independently from the crankshaft 12, in an unconnected and uncoupled manner. In other words, the crankshaft 12 and the compressor-turbine shaft 13 operate on separate and independent revolutions-per-minute curves.

Figure 14:
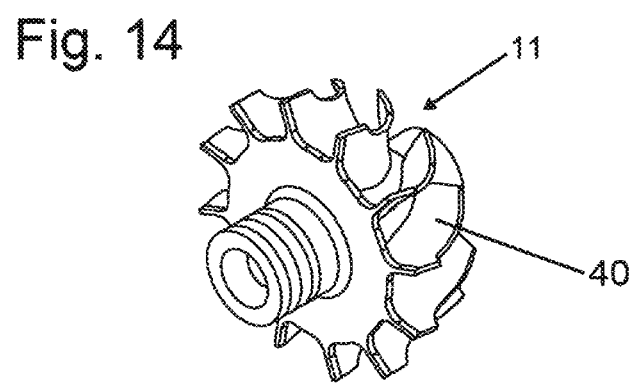
FIG. 14 shows an isomeric view of the turbine wheel.
Figure 15:
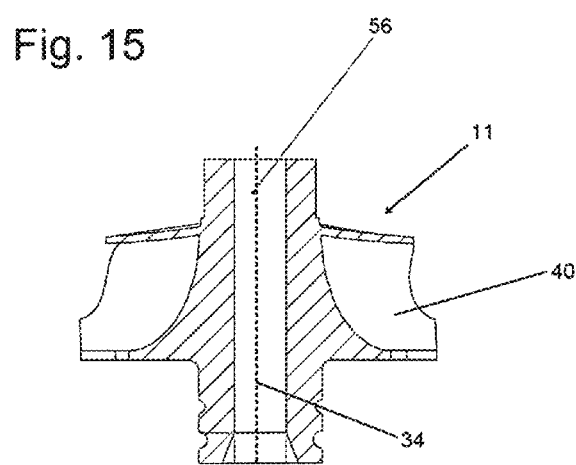
FIG. 15 shows a cross-sectional view of the turbine wheel.

As shown in FIG. 14, the turbine wheel 11 is provided with a plurality of turbine fins 40. The turbine wheel 11 includes an aperture 56, along axis 34, and, in one embodiment, is mechanically connected to the compressor-turbine shaft 13 by way of a mechanical press-fit. In one embodiment, the turbine fins 40 are symmetrical about axis 34. FIG. 15 shows a cross-section view of the turbine wheel 11. As shown therein, in one embodiment, the aperture 56 extends through the entire body of the turbine wheel 11.

Figure 16:
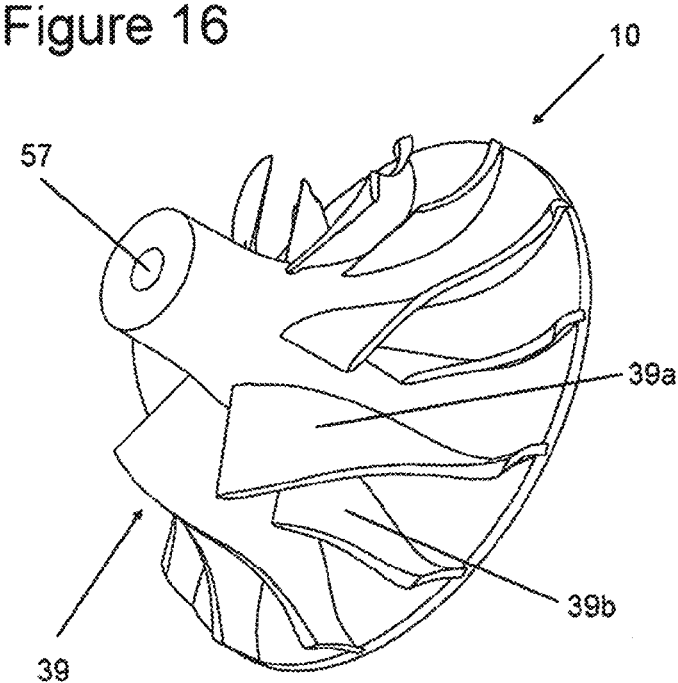
FIG. 16 shows an isomeric view of the compressor wheel.
Figure 17:
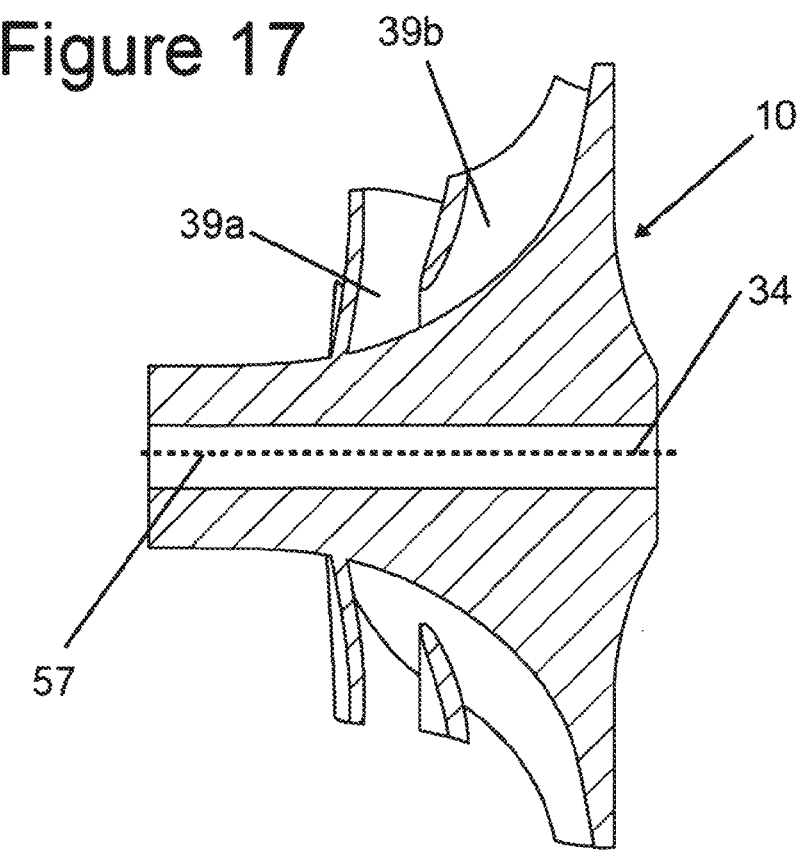
FIG. 17 shows a cross-sectional view of the compressor wheel.

FIG. 16 shows the compressor wheel 10. The compressor wheel 10 is provided with a plurality of compressor fins 39. The compressor wheel 10 includes an aperture 57, along axis 34, and, in one embodiment, is mechanically connected to the compressor-turbine shaft 13 by way of a mechanical press-fit. In one embodiment, the compressor fins 39 are divided in to two groups, 39*a* and 39*b*. In one embodiment, the compressor fins are provided with distinct geometry such that compressor fins 39*a* and compressor fins 39*b* are not symmetrical about axis 34. FIG. 17 shows a cross-section view of the compressor wheel 10. As shown therein, in one embodiment, the aperture 57 extends through the entire body of the compressor wheel 10.

Figure 18:
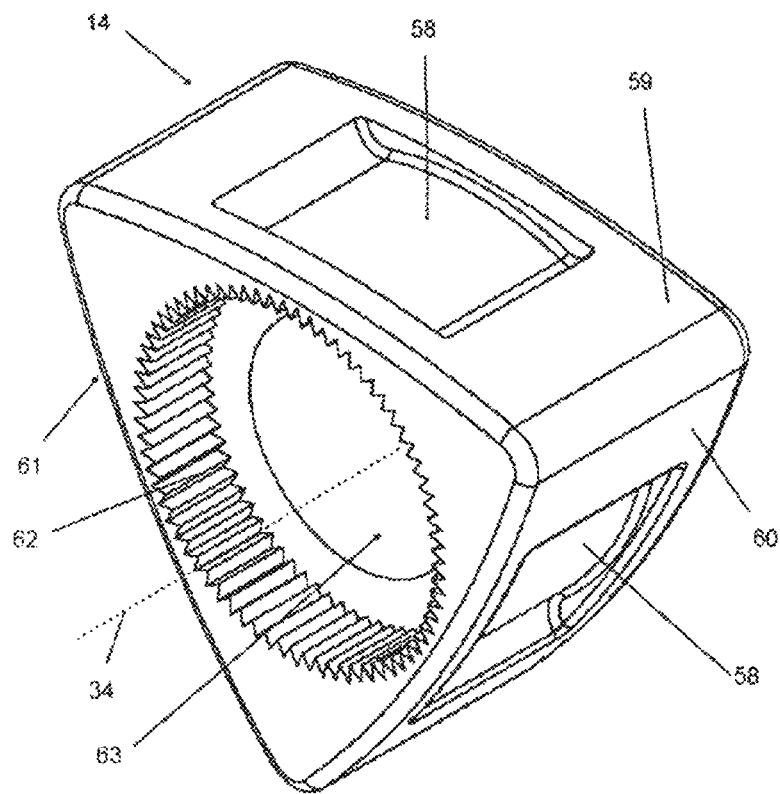
FIG. 18 shows an isomeric view of the combustion rotor.

FIG. 18 shows a combustion rotor 14. In one embodiment, the combustion rotor 14 is shaped in a generally triangular form having three sides, or faces 59-61. In one embodiment, the combustion rotor 14 has three equal faces: face 59, face 60, and face 61. In one embodiment, the combustion rotor 14 is shaped in the form of a Reuleaux triangle. As shown in FIG. 18, the combustion rotor 14 includes combustible pockets 58, or recesses 58 on each face 59-61. The combustion rotor 14 includes an aperture 63 that is aligned with axis 106, and a set of rotor gears 62 or teeth. The rotor gears 62 are formed to be concentric about axis 106 and project toward the axis 106. Aperture 63 is concentric with minor axis 106 which runs through center of eccentric lobe. Offset between major and minor axis greatly influences compression ratio. During operation, the combustion rotor 14 is located in the combustion rotor housing 4 and rotates about minor axis 106, which in-turn rotates about axis 34 of the crankshaft 12. Combustion occurs within the combustion chamber bore 24 by a spark plug (not shown). Pressure is converted between the combustion chamber bore 24 of the combustion rotor housing 4 between the combustible combustion pockets 58.

Figure 19:
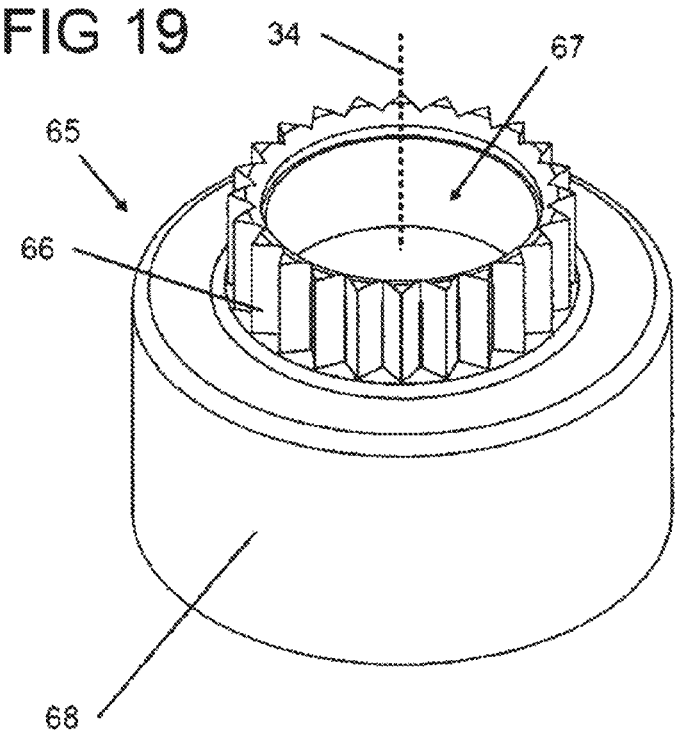
FIG. 19 shows an isomeric view of the stationary gear.

FIG. 19 shows a stationary gear 65. The stationary gear 65 is located coaxially to axis 34 and includes stationary gear set 66, or teeth 66 and a surface 68, which is fixed to the cold side cooling port 90. The stationary gear 65 includes an aperture 67 that is concentric about axis 34, through which crankshaft 12 passes through. The stationary gear set 66 is concentric about axis 34 and the teeth of the gear set 66 project outwardly from the axis 34. The stationary gear set 66, of the stationary gear 65, mechanically interacts with the rotor gear teeth 62 of the rotor 14. In one embodiment, the ratio between the stationary gear set 66 and the rotor gears 62 is 3:1.

Figure 20:
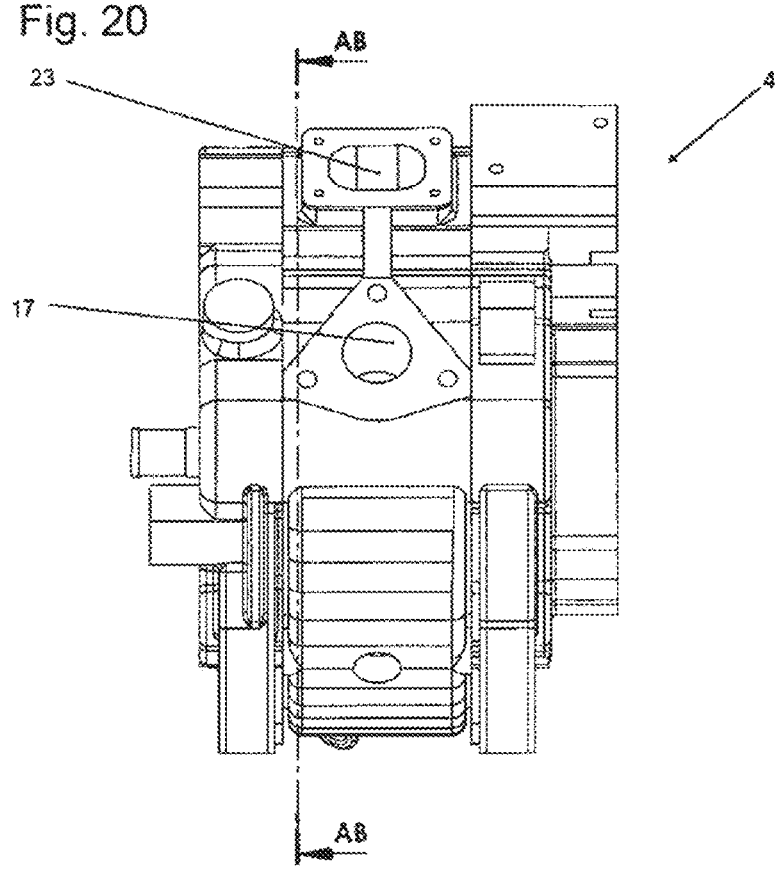
FIG. 20 shows a front-view of the combustion rotor housing.
Figure 21:
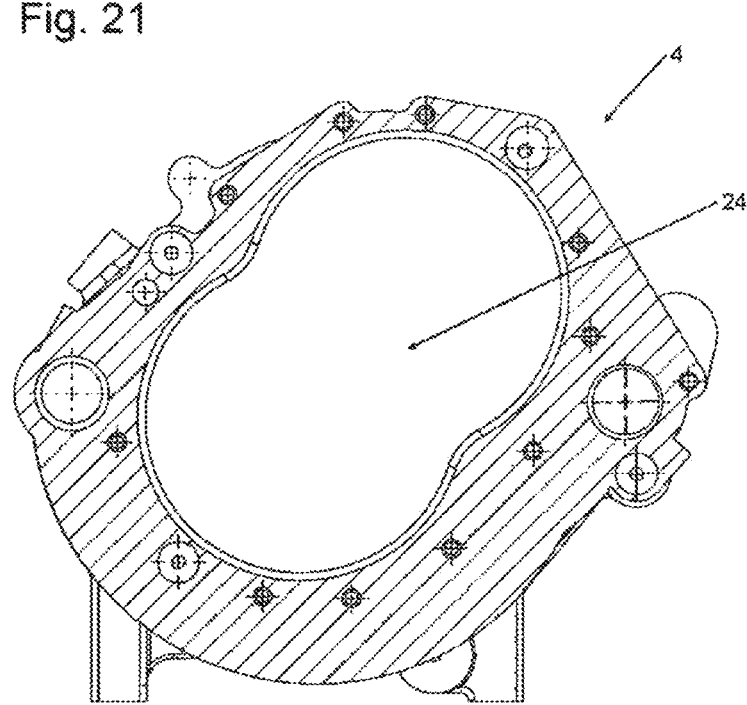
FIG. 21 shows a cross-section view of the combustion rotor housing and the power takeoff housing.

FIG. 20 provides a side view of the combustion rotor housing 4. As shown therein, the exhaust port 17 and the intake port 23 are located there on. FIG. 21 provides a cross-section view of the combustion rotor housing 4 at A-B of FIG. 20. As shown in FIG. 21, the combustion chamber bore 24 is formed with a generally oval-like epitrochoid-shaped in order to accommodate the generally Reuleaux triangle shaped combustion rotor 14.

Figure 22:
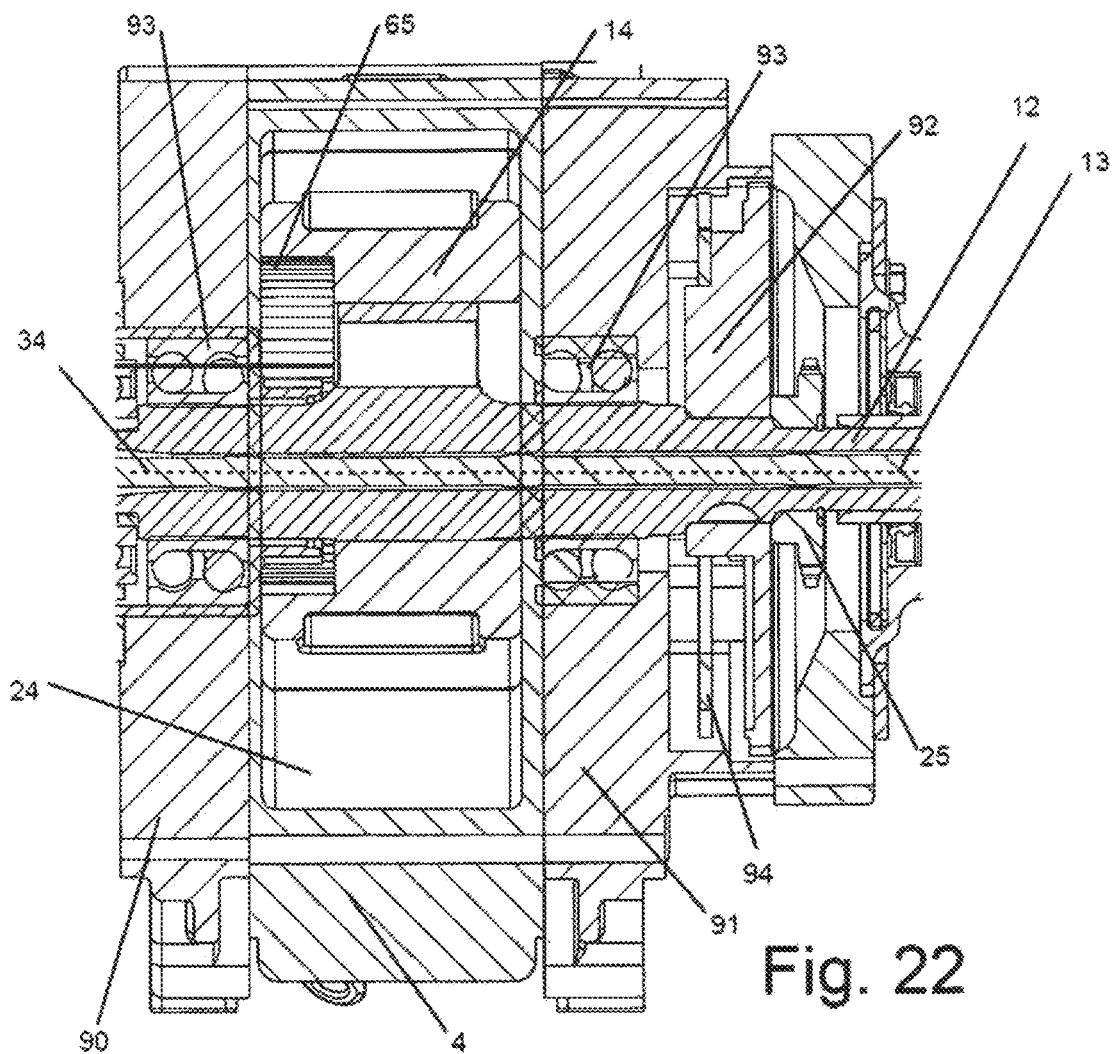
FIG. 22 shows a front-cross-section view of the combustion rotor housing.

FIG. 22 shows a cross section view of the combustion rotor housing 4. A first cooling port 90 and a second cooling port 91 are located adjacent to the combustion rotor housing 4. The combustion rotor 14 is located within the combustion chamber bore 24 of the combustion rotor housing 4. The combustion rotor 14 is located on the lobe 9 of the crankshaft 12 and the compressor-turbine shaft 13 is located within the aperture 42 of the crankshaft 12. The stationary gear 65 is located adjacent to the combustion rotor 14 and is operationally connected to the combustion rotor 14 and is coaxially located with axis 34. During operation, rotation of the combustion rotor 14 is caused by combustion within combustion housing bore 24; the force applied to the rotor sides is directed by the stationary gear 64. The rotor, therefore, forces, or causes, the crankshaft 12 to rotate. Located adjacent to the second cooling port 91 is the power take off housing 5. The sprocket gear 25 is attached to the crankshaft 12 and is located within the power take off housing 5. During operation, rotation of the crankshaft 12 causes the sprocket gear 25 to rotate. The flywheel 92 is attached to the crankshaft 12 and is located between the combustion rotor 14 and the sprocket gear 25. A crankshaft trigger wheel 94 is fixed to the flywheel 92 and is coaxially oriented with axis 34. The crankshaft trigger wheel 94 rotates in conjunction with the crankshaft 12. During the rotation, the crankshaft trigger wheel 94 trips a sensor (not shown) that communicates with the engines electronic system to provide data for numerous functions.

FIG. 23 shows a cross sectional view of the turbine housing flange 45. The axis of the turbine housing flange 45 is co-axial with axis 34. The turbine housing flange 45 includes a sealing surface 71; the sealing surface 71 cooperates with seal(s) 44 and 48 (see FIG. 9) located on surfaces 71 and 74 respectively, to seal the turbine housing 8. This seals 44, 48 retain oil within the turbine housing flange 45 and maintain the boost positive pressure exhaust gasses within the turbine housing 8. The turbine housing flange 45 includes a bearing cooperating surface 72, the bearing cooperating surface 72 includes aperture(s) 73 of varying diameters, which enable oil flow for bearing lubrication and cooling. Apertures within the turbine housing 45 are used as "oil drains." In a similar fashion to the cold side bearing retainer 85, the "oil drains" and are radially spaced from axis 34; however there is greater "oil draining" capacity in the flange turbine housing 45 then in the cold side bearing retainer 85, as a pressure differential is desired from the cold side of the engine to the hot side of the engine, in order to facilitate the flow of cool oil through the center of the crankshaft. The bearing cooperating surface 72 cooperates with the bearing 47 (see FIG. 9) in order to allow and maintain concentricity of the turbine housing flange 45 along major axis 34. Counter bore 82, located in power take-off housing 5, is of a relatively large diameter as compared to the mating surface 76 of the turbine flange 45; this feature, in concert with turbine housing retainer 97, allows the turbine.

FIG. 24 shows an isomeric view of the compressor flange 52. The axis of the compressor flange 52 is co-axial with axis 34. The compressor flange 52 includes a sealing surface 76. The sealing surface 76 cooperates with seal 44 (see FIG. 8) to seal the compressor housing 1, thereby retaining oil within the turbine retainer, or cold side bearing retainer 51 and maintaining the boost manifold pressure in the compressor housing 1. The compressor flange 52 also includes a number of apertures 78. The flange apertures 78 cooperate with bolt(s) 79 (see FIG. 8) to secure the compressor flange 52 to the cold side bearing retainer 51. At one end of the compressor flange 52 is the compressor cooperating surface 80. In the assembly, the compressor cooperating surface 80 is located adjacent to the compressor wheel 10. During operation, the compressor cooperating surface 80 cooperates with the compressor wheel 10 to create the boost increased manifold pressure within the compressor housing 1. In one embodiment, compressor-turbine shaft 46 is also fixed to compressor flange 52 and co-axially aligned along major axis 34, to ensure concentricity within crankshaft 12.

FIG. 25 shows a cross-sectional view of the power takeoff housing 5. As shown therein, the axis of the power takeoff housing 5 is coaxial with axis 34. The power takeoff housing 5 is formed to include a housing surface 81 and a flange surface 82. The housing surface 81 cooperates with the second hot side cooling port 91, and the flange surface 82 cooperates with the turbine housing flange 45 to locate the power takeoff housing 5. When assembled, the power takeoff housing 5 encloses the flywheel 92 and the sprocket gear 25. In one embodiment, the power takeoff housing 5 includes a cut-out to provide access to the flywheel 92 or the sprocket gear 25, as well as the ingress and egress of a chain or gear drive system (not shown). FIG. 26 details the power takeoff housing 5 which includes a number of apertures: fastener apertures 83, and fastener apertures 84. Fastener apertures 83 facilitate mounting of the power takeoff housing 5 to the Hot Side Cooling port 91. Fastener apertures 84 cooperate with the turbine housing retainer 97 to locate the power takeoff housing 5 within the engine assembly. In one embodiment, shown in FIG. 26, the axes of the fastener apertures 84 are concentrically located 23 about axis 34. In one embodiment, the ten fastener apertures 84 are radially spaced from axis 34 and angularly positioned at 36 degrees. In one embodiment, the power take off housing 5 is be constructed of a material with a relatively low coefficient of thermal conductivity, as to maintain the exhaust heat within the turbine housing flange.

FIG. 27 shows a compressor cold side bearing retainer 85. The axis of the compressor retainer 85 is coaxial with axis 34. The compressor cold side bearing retainer 85 includes fluid fastener apertures 86 and fastener apertures 87, which enables the cold side bearing retainer to be fastened to cold side cooling port 90. Aperture 87, in turn creates provision for the compressor flange 52, to be mated to cold side bearing retainer 85. The compressor cold side bearing retainer 85 includes a first oil squirter 88 radially spaced from the axis 34 and a second oil squirter 89 radially spaced from the axis 34, which provide apertures for incoming oil and serve to both lubricate the oil seals and bearings located within the cold side assemblies(s), as well as to "squirt" oil along axis 34, through the crankshaft aperture 42. The oil lubricates the bearing(s) 33 and cools the cranks shaft 12 and combustion rotor 14. A first oil drain 95 and a second oil drain 96 are radially spaced from axis 34, to facilitate oil drainage during off camber operation, or when the engine endures sustained lateral forces (e.g., sustained high "g" turn in an aircraft). Section O-O provides a cross-sectional view of the oil squirter 88, while section L-L provides a cross-sectional view of the first oil drain 95. The cold side bearing retainer 85 functions to locate the crankshaft 12 along the axis 34, as well as ensure concentricity of the compressor flange 52.

Figure 28:
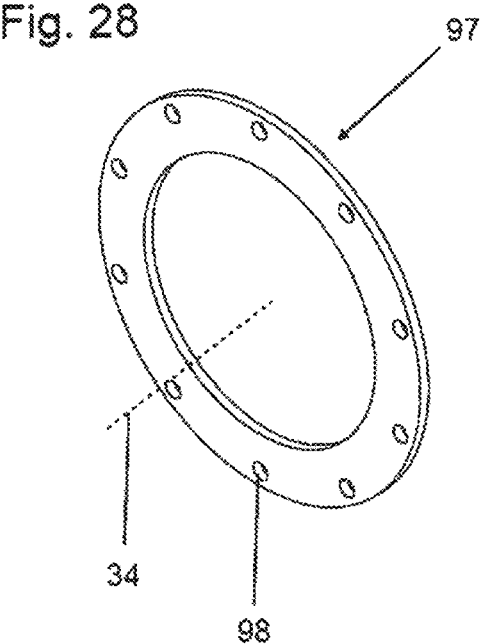
FIG. 28 shows an isomeric view of the turbine housing retainer.

FIG. 28 shows a turbine housing retainer 97. As shown therein, the axis of the turbine housing retainer 97 is co-axial with axis 34. Spaced radially from the axis are apertures 98. In one embodiment, the turbine housing retainer 97 is provided with 10 apertures 98 angularly positioned at 36 degrees. The axis of apertures 98 are co-axial with axis the fastener apertures 84, and cooperate to locate as secure the power take off housing 5.

Figure 31:
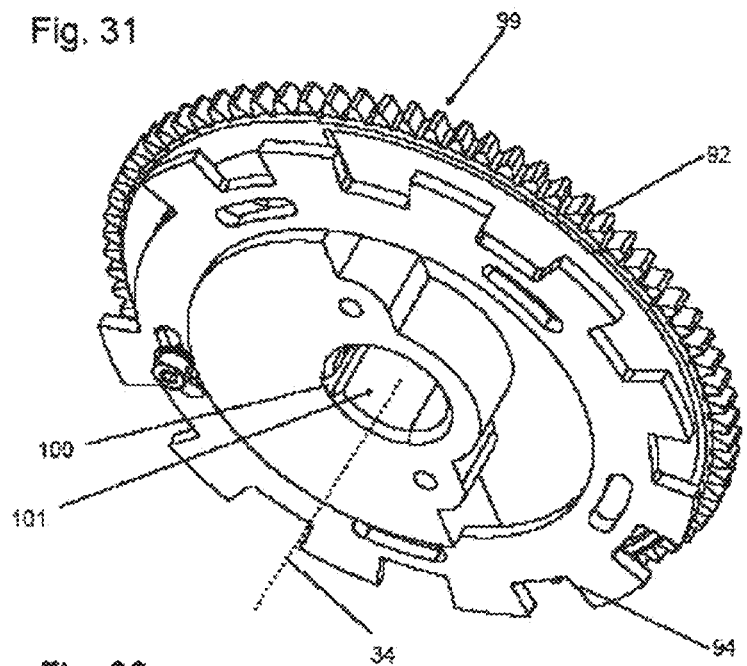
FIG. 31 shows a rear isomeric view of one embodiment of the flywheel assembly.
Figure 32:
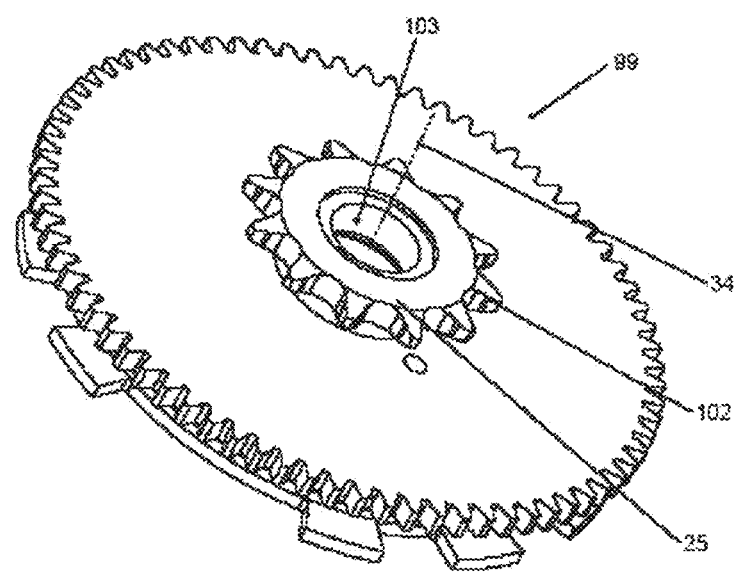
FIG. 32 shows a front isomeric view of one embodiment of the flywheel assembly.
Figure 33:
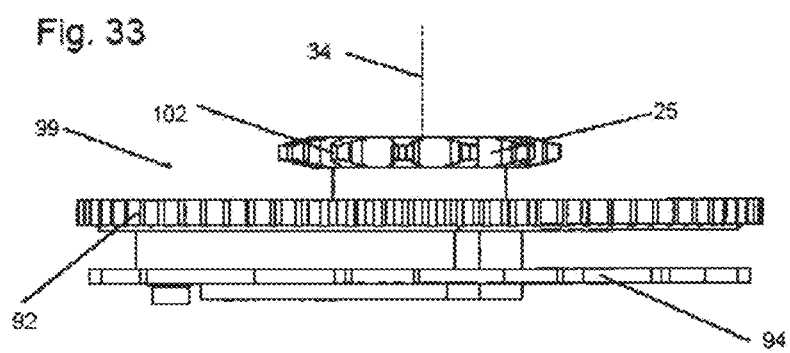
FIG. 33 shows a side view of one embodiment of the flywheel assembly.
Figure 34:
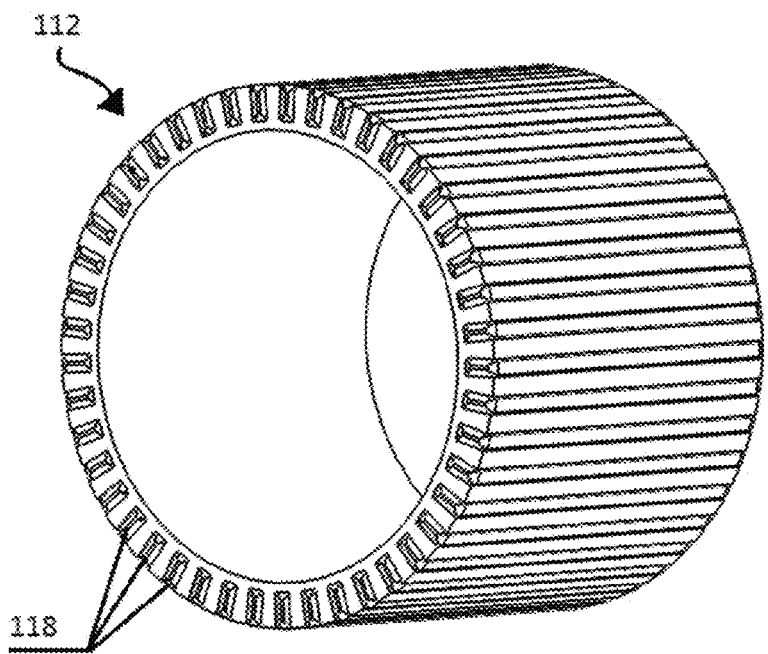
FIG. 34 shows a stator from the induction generator isolated in a perspective view.
Figure 35:
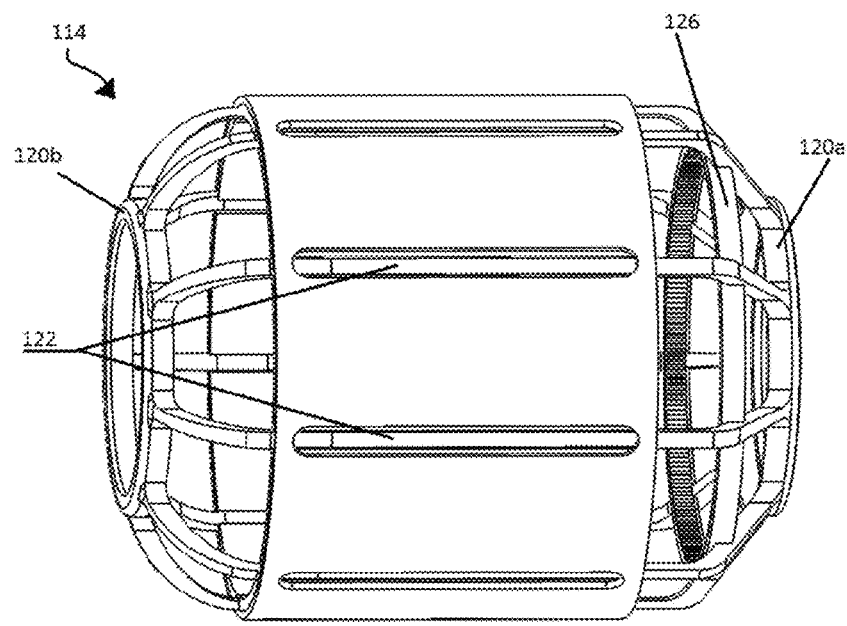
FIG. 35 shows an induction rotor from the induction generator isolated in a perspective view.

As shown in FIGS. 31-33, a flywheel assembly 99 includes the crankshaft trigger wheel 94, the flywheel 92, and the sprocket gear 25. As shown therein, the flywheel assembly 99 is co-axial with axis 34. The flywheel 92 includes an aperture 101 and a flywheel keyway 100; the keyway 100 corresponds to the crankshaft keyway 104 on the crankshaft 12, as shown in FIG. 12. During operation, as the crankshaft 12 rotates, the mechanical connection between the flywheel keyway 100 and the crankshaft keyway 104 causes the flywheel assembly 99 to rotate. However, in one embodiment, a number of keyways 100 and 104 create a spline to connect the crankshaft 12 and the flywheel assembly 99. In one embodiment, the crankshaft trigger wheel 94 is secured to the flywheel 92 by way of a fastener, such as a bolt. In another embodiment, the crankshaft trigger wheel 94 is welded to the flywheel 92. In one embodiment, the sprocket gear 25 is secured to the flywheel 92 by way of a fastener, such as a bolt. In another embodiment, the sprocket gear 25 is welded to the flywheel 92.

As further depicted in FIGS. 31-33, the sprocket gear 25 includes a set of gear teeth 102. In one embodiment, the sprocket gear 25 includes a set of gear teeth 102 numbering twelve. The sprocket gear 25 includes a sprocket aperture 103 where, while assembled, the crankshaft 12 is located. The sprocket gear includes an axis that is co-axial with axis 34. In alternative embodiments, the sprocket gear 25 and the flywheel 92 are manufactured as one part. In one embodiment, the flywheel 92 and the crankshaft trigger 94 wheel are manufactured as one part; in one embodiment, the sprocket gear 25, the flywheel 92, and the crankshaft trigger 94 are manufactured as on part.

Figure 4:
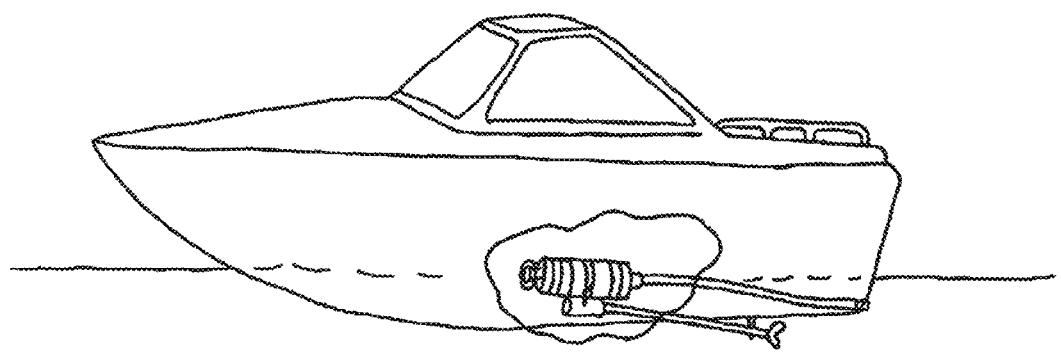
FIG. 4 shows one embodiment of the co-axial turbo rotary engine in a marine conveyance, a boat.
Figure 5:
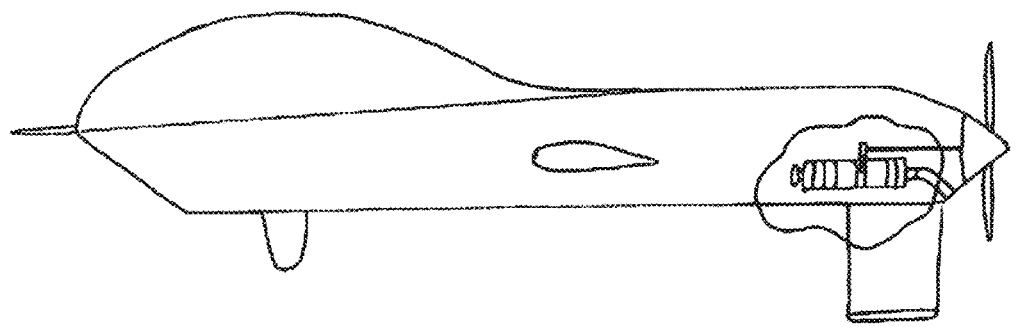
FIG. 5 shows one embodiment of the co-axial turbo rotary engine in an aeronautical conveyance, a Unmanned Aerial Vehicle.

Embodiments of the present disclosure provide an improved power-plant, of a hybrid nature, utilizing novel concepts in the turbine and rotary engine art to create a unique mechanism with superior performance characteristics with regard to brake specific fuel consumption, horsepower per liter, and reduced emissions output ($CO_2$/kW). This engine is an excellent fit for hybrid-electric applications due to its improved efficiency, smaller packaging area, and significantly reduced weight when compared to today's traditional internal combustion engines. This power-plant is intended to be used in traditional motor vehicles, marine, aviation, as well as autonomous power generation units. Furthermore, this engine could be produced in a very small scale, perfectly suiting it for unmanned aviation drones and military applications of similar natures. The disclosure is easily scalable in size and power to these different applications, and future vehicles could be designed around this much more compact and efficient configuration. FIG. 4 shows one embodiment of the power plant utilized in a boat; FIG. 5 shows one embodiment utilized in an aeronautical conveyance, a drone.

One embodiment of the rotary style internal combustion power-plant comprises a compressor housing, wherein a compressor is housed, a combustion rotor housing, located adjacent to the compressor housing, wherein a rotor is housed, a power take-off housing, located adjacent to the combustion rotor housing, and a turbine housing, located adjacent to the power take-off housing, wherein a turbine is housed. Another embodiment of the rotary-style internal combustion power-plant includes a compressor housing, a combustion rotor housing, a power take-off housing, and the turbine housing are located co-axially along a crankshaft. One embodiment of the rotary-style internal combustion power-plant comprises a compressor housing, wherein a compressor is housed, an electric machine housing, located adjacent to the compressor housing, wherein an electric machine is housed, a charge air cooler housing, located adjacent to the electric machine housing, a combustion rotor housing located adjacent to the charge air cooler housing, a power take-off housing located adjacent to the combustion rotor housing, a combustion rotor located adjacent to a power take-off housing, an auxiliary pump housing (oil, coolant and fuel) located adjacent to the combustion rotor, and a turbine located adjacent to the auxiliary pump housing (oil and coolant), wherein the housings are manufactured as separate entities and are stacked along a singled access.

Figure 29:
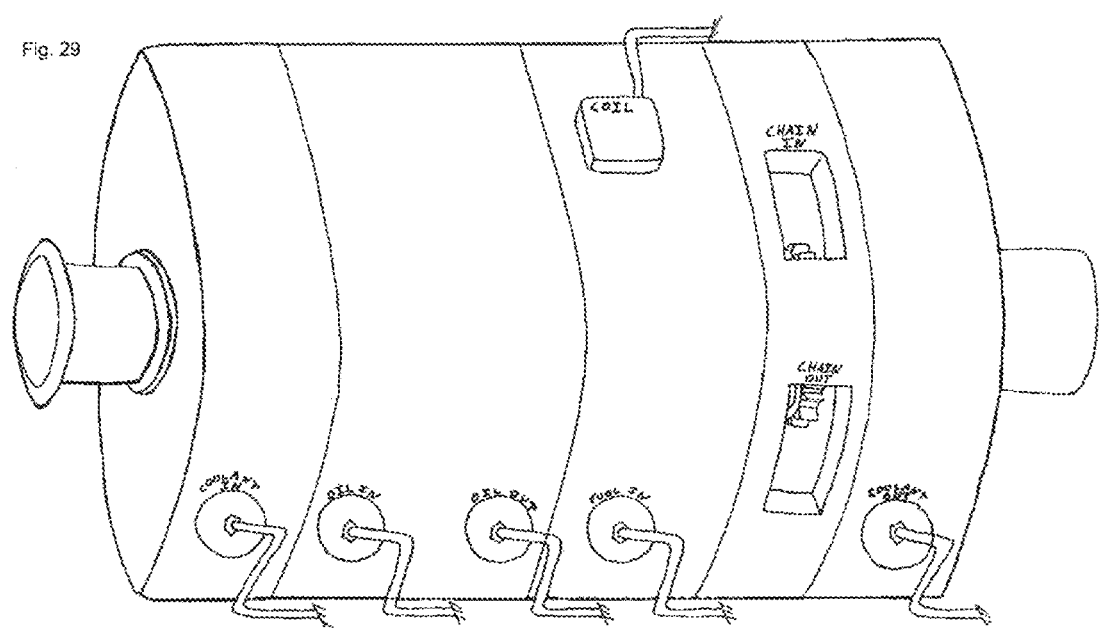
FIG. 29 shows an elevated view of one embodiment of a co-axial turbo rotary engine.
Figure 30:
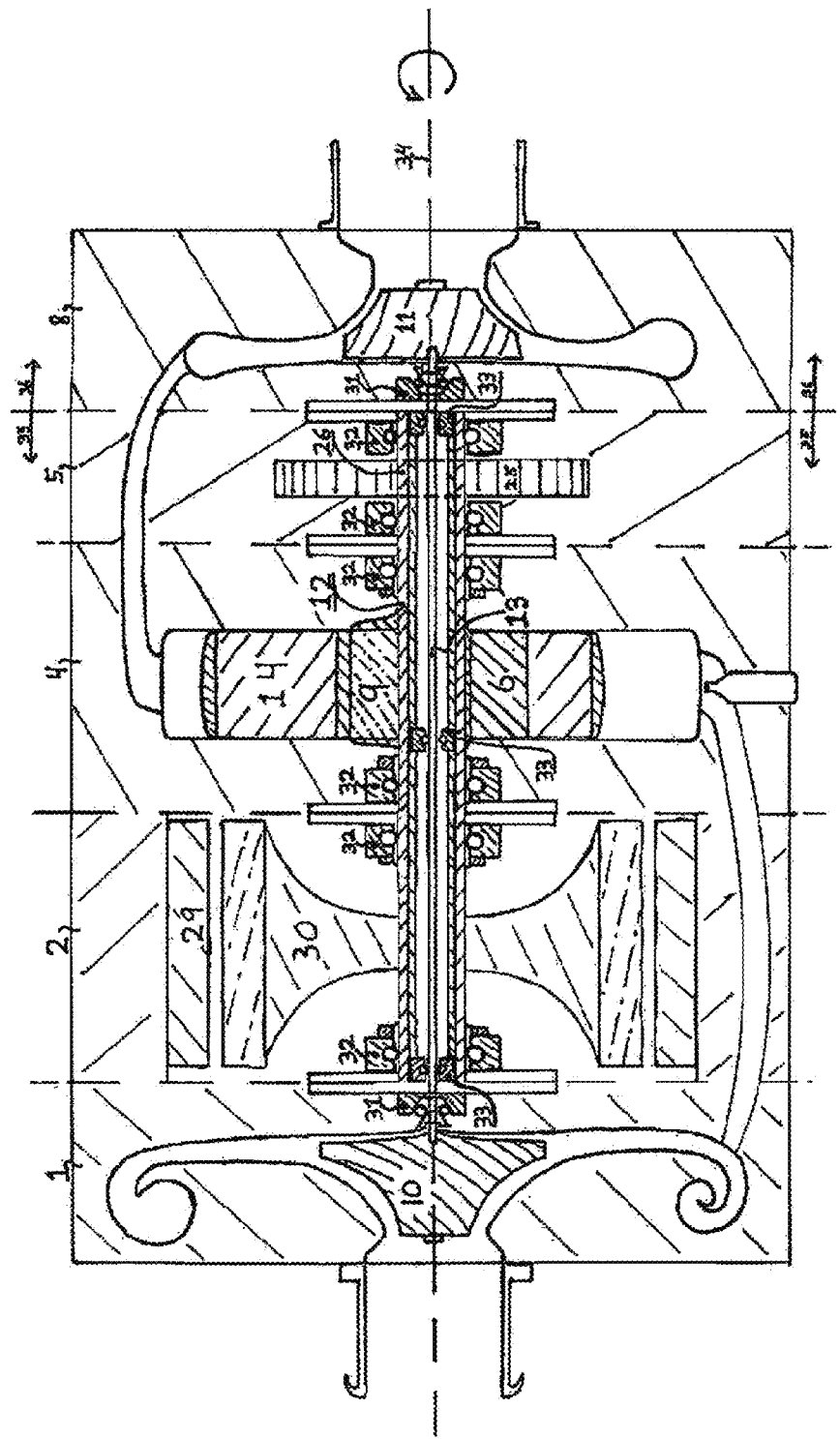
FIG. 30 shows an elevated cross-sectional view of one embodiment of a co-axial rotary engine.

FIGS. 29 and 30 show one embodiment of the present engine. As shown in FIG. 30, the compressor housing 1 is located adjacent to the electric machine housing 2. The compressor wheel 10 is located within the compressor housing 1. The axis of the compressor housing 1 and the axis of the electric machine housing 2 are co-axial with axis 34. As shown therein, the stator 29, or field 29, is located within the electric machine housing 2. The armature 30 is also located within the electric machine housing 2. The compressor wheel 10 is located at one end of the compressor-turbine shaft 13. A bearing 31 locates the compressor-turbine shaft 13 with respect to the compressor housing 1. The crankshaft 12 is provided with an aperture, and the compressor-turbine shaft 13 is located within the aperture of the crankshaft 12.

Adjacent to the electric machine housing 2 is the combustion rotor housing 4. As shown in FIG. 30, the combustion rotor housing houses a combustion rotor 14. During operation, the combustion rotor rotates about axis 34 and causes the crankshaft 12 to rotate. Located adjacent to the combustion rotor housing 4, is the power takeoff housing 5. The axis of the power take off housing 5 is co-axial with axis 34. As shown therein, the power takeoff housing 5 surrounds the sprocket gear 25 and a driven shaft 26. As shown in FIG.

30, the crankshaft 12 is located within the housings by way of bearings 32. Located adjacent to the power takeoff housing 5 is the turbine housing 8. Located within the turbine housing 8 is the turbine wheel 11. The turbine wheel 11 is secured to the compressor-turbine shaft 13. The compressor-turbine shaft 13 is located within the housing assembly by bearings 31. During operation, the bearings 33 allow the compressor-turbine shaft 13 to rotate independent of crankshaft 12. In other words, there is no torsional or mechanical coupling between the compressor-turbine shaft 13 and the crankshaft 12. This allows relative motion and varying rotation speed differences between the compressor-turbine shaft 13 and the crankshaft 12 such that they operate entirely independent from one another.

Figure 36A:
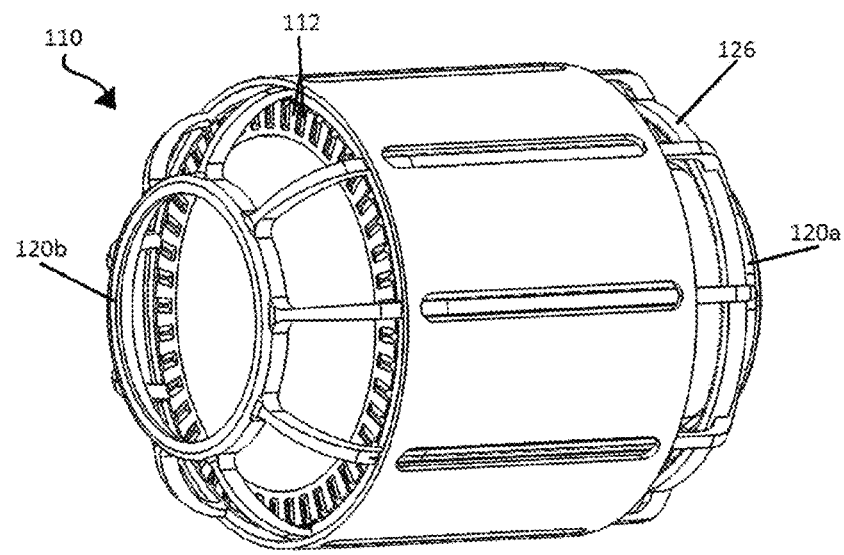
FIG. 36a shows an induction generator isolated in a perspective view.
Figure 36B:
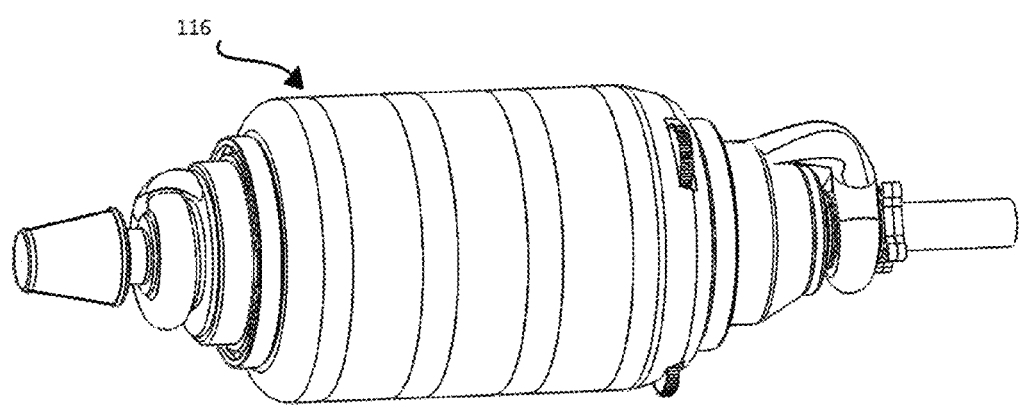
FIG. 36b shows an outer surface of the combustion rotor housings with the induction generator removed.
Figure 37:
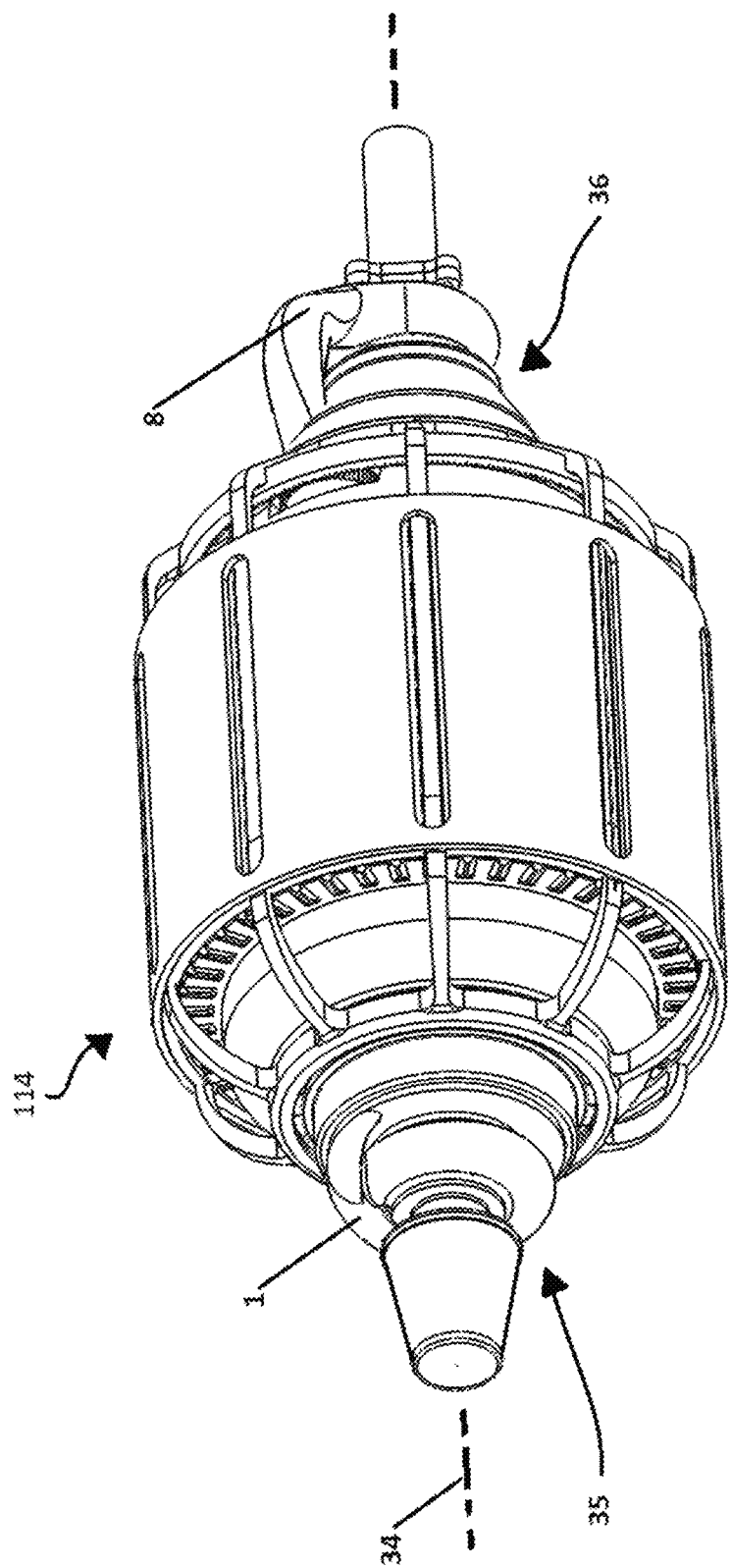
FIG. 37 shown the induction generator positioned around the internal combustion engine.
Figure 38:
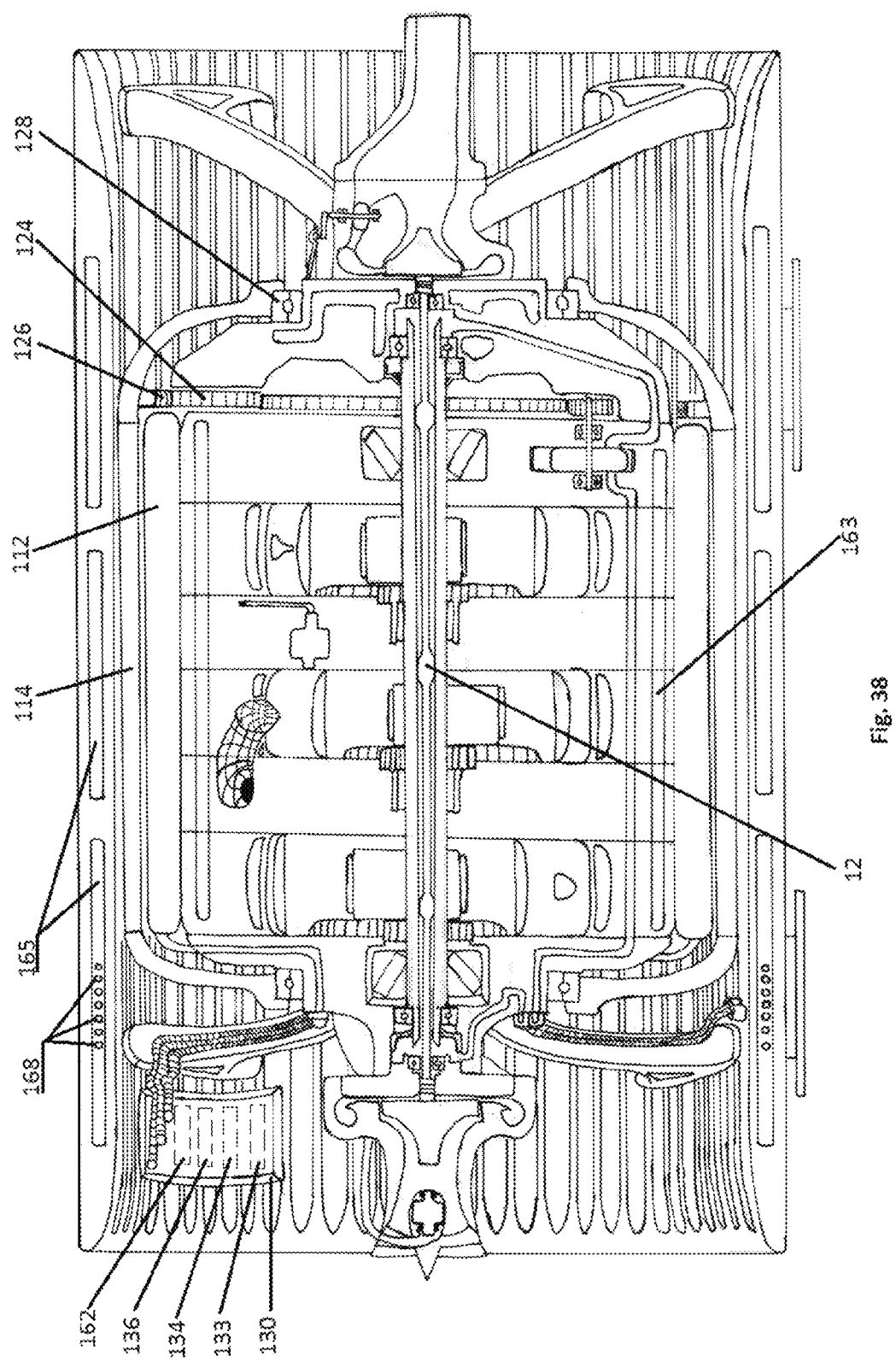
FIG. 38 is a sectional view of an embodiment of the invention having the induction generator surrounding the internal combustion engine.

In another embodiment shown in FIGS. 36, 37 and 38, the internal combustion power-plant includes an induction generator 110 positioned around, and co-axially in line with, the combustion rotor housing 4. As understood by those having ordinary skill in the art, an induction generator 110 includes a stator 112 and an induction rotor 114. As referenced herein and understood by those having ordinary skill in the art, an induction generator is a type of AC electrical generator that uses the principles of induction motors to produce power. The induction generator 110 operates by mechanically turning the induction rotor 114 faster than the synchronous speed, giving negative slip. Likewise, if electricity is provided to the stator 112 such that the induction rotor 114 turns slower than the rate of the rotating flux, the induction rotor 114 is rotated by the magnetic field, producing a mechanical output like an induction motor. In this regard, the induction generator 110 is characterized herein as being able to function as either a generator or a motor.

The stator 112 is positioned around the combustion rotor housings 4, and is preferably secured to an outer surface 116 of the combustion rotor housings 4. Preferably the outer surface 116 is cylindrical in shape to facilitate close fitment, sufficient heat transfer between housings, and proper operation between the stator 112 and the induction rotor 114, such that the induction rotor 114 can rotate about the stator 112 and the common axis 34 while maintaining a consistent distance between the two at all positions, or degrees of rotation. The stator 112 can be any suitable type of stator that is well-known in the art, and preferably the stator 112 includes electrically-conductive windings 118 formed from a metal material. Even more preferably, the metal material is copper. As known in the art, the windings 118 can be wound around stacked steel plates. Alternatively, the stator 112 can have any other type of construction that is well-known in the art. The stator 112 can have any suitable number of poles, but preferably the stator 112 uses three-phase power to electrically interact with the induction rotor 114, as described in greater detail below. But it is understood that any suitable number of phases can be utilized herewith.

As the term is understood by those having ordinary skill in the electrical arts, the induction rotor 114 is a "squirrel-cage" style rotor having a pair of opposed induction rotor hubs 120a, 120b and a plurality of conductive metallic bars 122 extending between the hubs. Preferably the bars 122 are formed from aluminum or copper, and preferably the bars 122 are oriented about the common axis 34, which is the axis of rotation of the crankshaft 12. Any suitable number of bars 122 can be supplied, but as an example shown in the drawings, nine bars 122 are provided. Alternatively, the bars 122 can comprise a permanent magnet.

At least one of the induction rotor hubs 120a is mechanically coupled to the crankshaft 12, preferably using an idler gear 124, a plurality of interconnected gears, a continuously variable transmission (CVT), a combination thereof, or the like.

It is intended that "mechanically coupled," as referenced herein, is intended to mean that if two structural elements are described as being mechanically coupled, then mechanical movement (particularly rotational movement) from one element will cause the other mechanically-coupled element to move as well (and particularly to rotate). Contact between the two structural elements can be direct, or the elements can be indirectly in contact through a plurality of interconnecting members (such as gears, chains, belts, etc.).

In this embodiment, the induction rotor 114 and the crankshaft 12 are mechanically coupled, and rotating the induction rotor 114 will cause the crankshaft 12 to rotate, and vice versa. The induction rotor 114 and the crankshaft 12 can be mechanically coupled with each other via any suitable structure, such as an idler gear 124, a plurality of gears, a CVT, or any other suitable structure including those that use chains, belts, or the like. In the embodiment shown in the drawings, a ring gear 126 is secured to the bars 122 proximal to the induction rotor hub 120a. The ring gear 126 has an inner surface having a plurality of gear teeth which are mechanically coupled to the crankshaft 12 (or alternatively to the clutch mechanism 138, which is described in detail below).

The induction rotor hubs 120a, 120b each surround a respective end of the engine and rotate about the common axis 34. The induction rotor hubs 120a, 120b have an inner surface and are in contact with a bearing 128 that enable independent rotation between the induction rotor hubs 120a, 120b and the crankshaft 12. The bearing 128 can include ball bearings, pneumatic bearings, or any other suitable type of bearings that are well-known in the art.

The stator 112 is electrically connected to a power electronics 130 for supply, reception, and control over the electromagnetic field, as created by the interaction between the induction rotor 114 and the stator 112. The power electronics 130 is well-known in the art and commercially available, particularly for use with electric or hybrid-powered vehicles. Suitable examples of the power electronics 130 include those sold as the electrical control unit under the trademark PowerPhase Select® by UQM Technologies, or the SKAI Systems (IGBT or MOSFET) sold by the German company Semikron.

A battery 132 can also be provided to store electricity generated by the induction generator 110. The battery 132 is electrically connected to the power electronics 130. Any suitable type of battery 132 can be used herewith, including lithium-ion, dry-cell, and so forth. The specific type of battery used will be dependent upon the amount of storage necessary for each particular application, as determined by one having ordinary skill in the art. Similarly, a fuel tank 131, is incorporated to provide fuel for the internal combustion portion of the power-plant.

When the battery 132 is provided, the power electronics 130 includes means for converting alternating current (AC) to direct current (DC) 134. It is worth noting that the means for converting AC to DC 134 can optionally be provided when a battery 132 is not provided. However, the current produced by an induction generator 110 is AC, and that current must be converted to DC to be stored in the batteries that are commercially available today. The means for converting AC to DC 134 can include any suitable means that are well-known in the art, including a rectifier (using diodes), the circuitry and components used by the commercially-available power electronics identified above, or any other equivalents thereof that are well-known to those having ordinary skill in the art.

In use, fuel is provided from fuel tank 131, creating a fuel/air mixture which is combusted in the combustion rotor housing 4 which rotates the combustion rotor 14 and causes the eccentric shaft, or crankshaft 12, to rotate. The rotating crankshaft 12 then rotates the rotor 114 because the crankshaft 12 and the induction rotor 114 are mechanically coupled together. As understood by those having ordinary skill in the electrical arts, the induction rotor 114 is rotated above the synchronous speed of the magnetic field in the induction generator 110, and the resulting stator flux induces a current in the induction rotor 114 which in turn induces a current in the stator 112 that flows to the power electronics 130. A detailed discussion of this operation of the induction motor regarding magnetic fields and the like have been left out for purposes of this patent application because the operation is well-known in the art and is understood by those having ordinary skill in the electro-mechanical arts.

The current produced in the stator 112 of an induction generator 110 is AC. For applications in which AC is desired at various electrical components in the vehicle, the electricity can simply flow to the power electronics 130 and on to the electrical components, which are electrically connected to the power electronics 130. For applications in which DC is desired, such as when the electricity is to be stored in the battery 132, then the current is converted to DC by the means for converting AC to DC 134.

Therefore, it is shown in the embodiment described above how the combination of the combustion rotor housing 4 (and its internal components) and the induction generator 110 can function as a generator that converts fuel to electricity.

The power electronics 130 can also include any suitable type of programmable controller 136 for monitoring and/or controlling the amount of electricity generated and/or stored. The controller 136 can also optionally control the function of the engine and other components, such as the fuel pump. For example, the controller 136 can be commanded to drive the combustion rotor 14 at a speed to provide optimal charging to the battery 132 (when the battery 132 is provided). In another example, the controller 136 can be commanded to operate at any predetermined level when any particular level of power is being drawn off. The controller 136 can also be commanded to operate the generator 110 at a level less than 100% in order to maintain a minimum level of charge in the battery 132, or when the level of electricity being drawn is less than the generator's 100% capability. In addition, the controller 136 can be commanded to direct the electricity to any one of a plurality of batteries or circuits in order to power ancillary devices within the assembly or elsewhere on the vehicle. It is to be understood that the controller 136 can be commanded or operated in any number of ways. Alternatively, the controller 136 can work in conjunction with an engine control unit, or ECU 133. The power electronics 130 can also form part of the ECU 133, and the ECU 133 and/or power electronics 130 control the speed and load of the induction generator 110.

Figure 39:
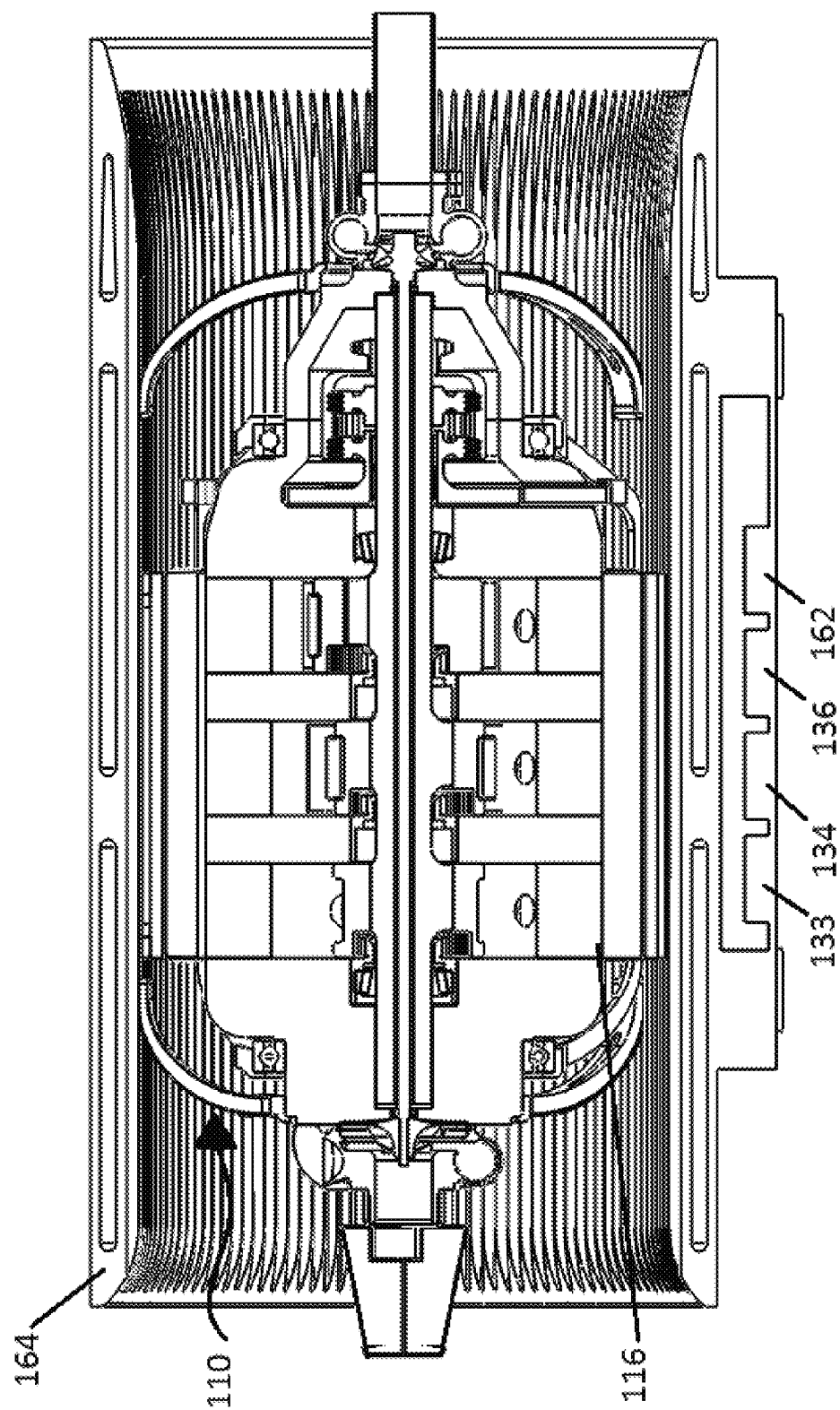
FIG. 39 is a perspective sectional view of an embodiment hereof showing the assembly of an induction generator surrounding the internal combustion engine and being positioned within a nacelle.
Figure 40:
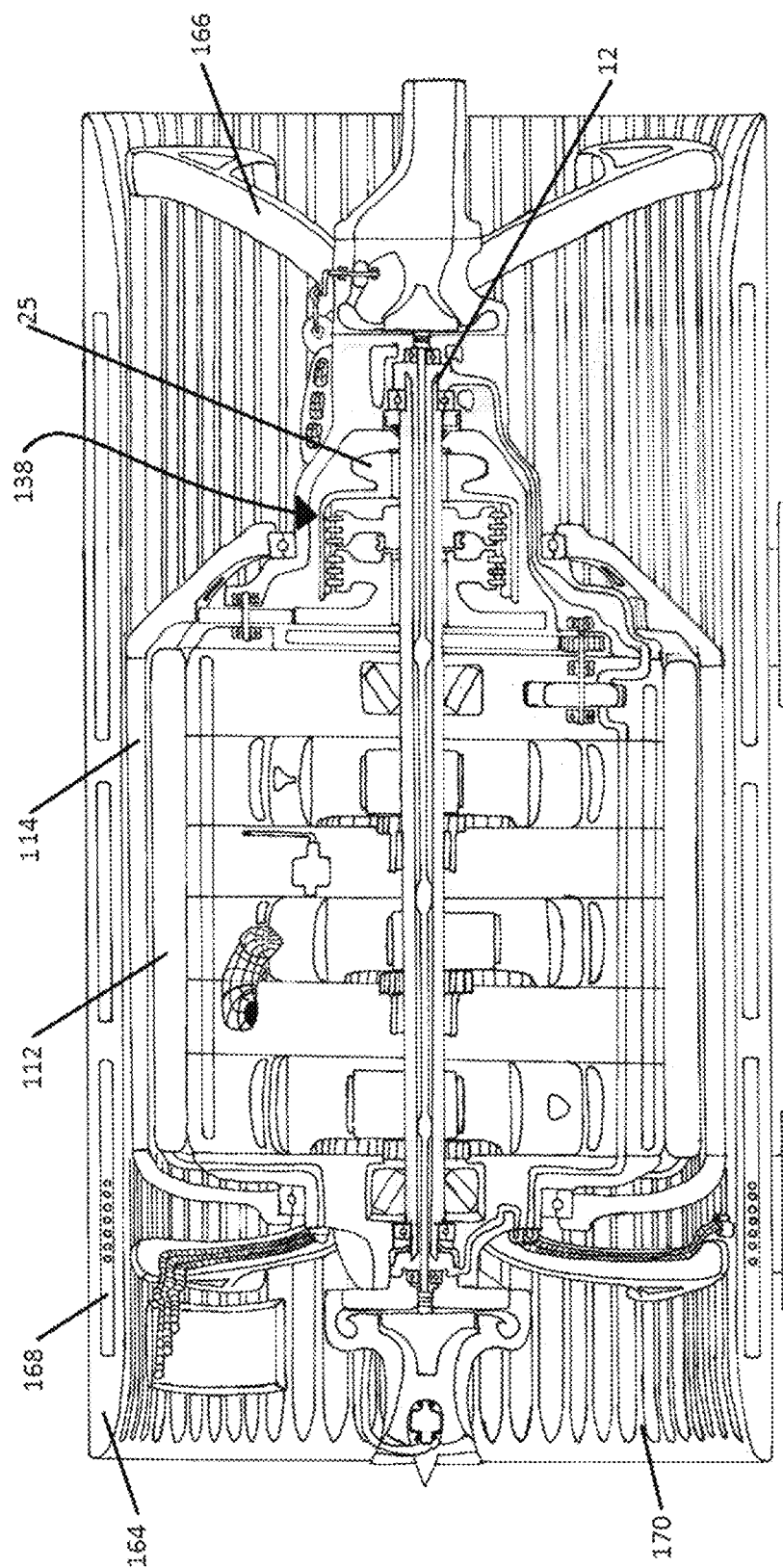
FIG. 40 is a sectional view of an embodiment of the invention having the induction generator surrounding the internal combustion and having a clutch mechanism for selectively engaging the sprocket, the crankshaft, and the induction rotor.

There is also provided an electro-mechanical embodiment shown generally in FIGS. 39 and 40 that is similar to the embodiment described above. This electro-mechanical embodiment is also similar in function to the electro-mechanical embodiment shown in FIG. 30. However, this embodiment utilizes the induction generator 110 described above.

Figure 41:
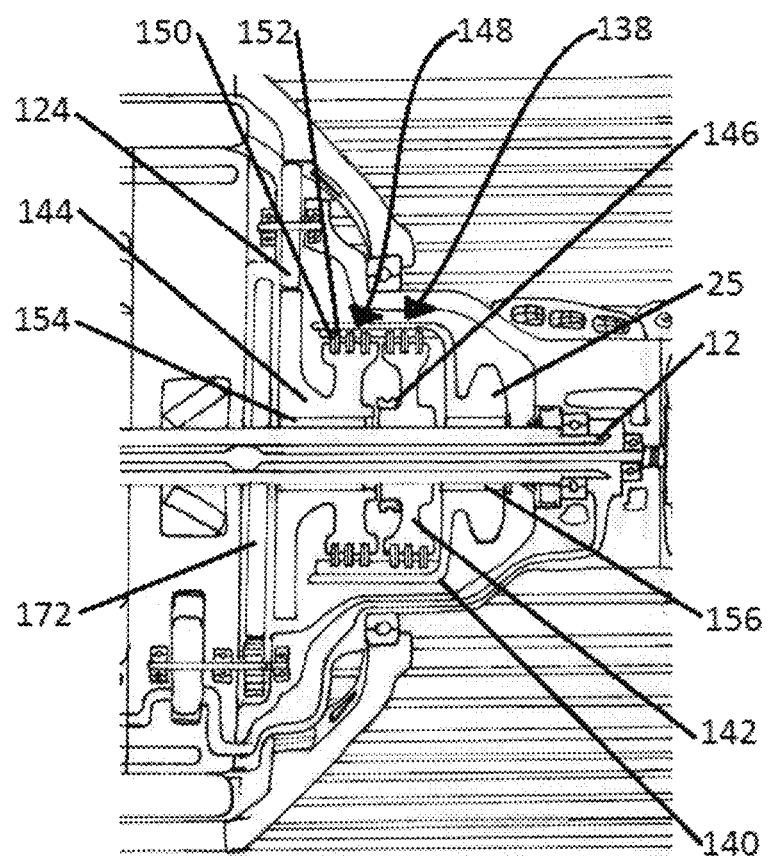
FIG. 41 is an enlarged sectional view of the clutch mechanism.

As shown in FIG. 41, there is provided a clutch mechanism 138 connected to the sprocket gear 25 (or any other mechanical output that is provided) that is selectively engageable with the crankshaft 12 and the induction rotor 114, whereby the clutch mechanism 138 can selectively engage: (1) only with the crankshaft 12; (2) only with the induction rotor 114; or (3) with both the crankshaft 12 and the induction rotor 114.

As shown in the drawings, the clutch mechanism 138 is not necessarily directly in contact with the induction rotor 114 or the crankshaft 12. The clutch mechanism 138 can include any suitable type of clutch that is well-known in the art. For example, the clutch mechanism 138 can include the types of clutches shown in U.S. Patent Pub. No. 2007/0144284 to Mitsubori et al., U.S. Pat. No. 8,127,636 to Tsukada et al., or U.S. Patent Pub. No. 2013/0056323 to Jakob-Bodenhagen et al., the entire disclosures of which are incorporated by reference herein.

Although the invention is not bound to any particular clutch mechanism 138 unless otherwise specified in the claims, the clutch mechanism 138 shown in FIG. 41 includes a clutch drum 140, a crankshaft clutch hub 142, an induction rotor clutch hub 144, and a clutch collar 146. A respective clutch pack 148 is positioned between each of the clutch hubs 142, 144 and the clutch drum 140. Each clutch pack 148 is preferably a multi-plate clutch having a plurality of clutch plates 150 and friction plates 152. As understood by those having ordinary skill in the art, a piston (not shown) is actuated (either mechanically or hydraulically) against the plates 150, 152 to frictionally engage the plates 150, 152 together, thereby engaging that particular clutch hub with the clutch drum 140. A pressure plate (not shown) is positioned opposite the plates 150, 152 from the piston to resist the force applied on the plates 150, 152 by the piston. In this regard, the plates 150, 152 are pressed between the piston and the pressure plate when the clutch drum 140 is engaged with that particular clutch hub. However, this is just one type of clutch mechanism 138 that is known in the art, and any other suitable type of clutch mechanism that is well-known can be used herewith.

Optionally, there can be provided a CVT or other similar mechanism positioned between and connecting the crankshaft 12 to the sprocket gear 25.

The crankshaft clutch hub 142 is connected, or fixed, to the crankshaft 12 and the two rotate together. The induction rotor clutch hub 144 is either directly connected to the ring gear 126 on the induction rotor 114 or is mechanically coupled thereto, such as by being connected to an idler gear 124, a plurality of interconnecting gears, or a CVT that is connected to the induction rotor 114. A bearing 154 is provided between the crankshaft 12 and the induction rotor clutch hub 144 to allow relative independent rotation therebetween. As discussed above, any suitable bearing can be used, such as a needle bearing, ball bearing, pneumatic bearing, or the like.

In the embodiment shown in the drawings, the sprocket gear 25 and the clutch drum 140 are integrally formed as a single piece. Although the sprocket gear 25 and the clutch drum 140 must rotate together (at least in the embodiment shown in the drawings), the sprocket gear 25 and the clutch drum 140 can alternatively be separate pieces that are either directly secured to each other or indirectly. A bearing 156, such as a needle bearing, is provided between the sprocket gear 25 and the crankshaft 12 to allow relative rotation between the two.

In the embodiment shown, there is also provided a clutch collar 146 that can engage the clutch hubs 142, 144 together to allow synchronized rotation between the clutch hubs 142, 144. The clutch collar 146 has particular use when it is desired to have one of the clutch hubs 142, 144 drive the other, but not rotate the sprocket gear 25. In this regard, the clutch collar 146 is another example of a clutch mechanism 138 between the clutch hubs 142, 144.

There are several different states of engagement of the clutch mechanism 138 depending upon the desired use. For example, there is a "generator mode" in which the crankshaft 12 is rotated by the engine, and the crankshaft 12 in turn causes the induction rotor 114 to rotate and induce electricity in the stator 112. The crankshaft clutch hub 142 and the induction rotor clutch hub 144 are both disengaged from the clutch drum 140, thereby producing no output to the sprocket gear 25. The clutch hubs 142, 144 are engaged to each other by the clutch collar 146, and the crankshaft clutch hub 142 rotates the induction rotor clutch hub 144 via the clutch drum 140. In turn, the induction rotor clutch hub 144 is mechanically coupled to the induction rotor 114 and rotates the induction rotor 114 to generate electricity in the stator 112 which is outputted to the power electronics 130. As described above, this embodiment can also include the means for converting AC to DC 134, and also a battery 132 for optionally storing the electrical energy.

In another state of operation, there is provided a "dual-power mode" in which the engine and the induction generator 110 function together to drive the sprocket gear 25. As described above, this is useful when a maximum power output is necessary. For example, when a plane is taking off. In this case, both clutch hubs 142, 144 are engaged with the clutch drum 140 to drive the sprocket gear 25. The induction generator 110 functions as a motor because electricity is provided to the stator 112 to rotate the induction rotor 114. The ring gear 126 on the induction rotor 114 then works together with the liquid-fuel-powered crankshaft 12 to provide maximum power to the sprocket gear 25. It is apparent that this mode of operation can only be used to the extent that electricity can be provided to rotate the induction rotor 114 and fuel can be provided to the combustion housing 4 of the engine. Once the electricity in the battery 132 is exhausted, the induction generator 110 can no longer function as a motor, and the rotational power can only be generated by converting liquid or gas fuel energy, supplied by fuel tank 131.

When the "dual-power mode" functionality is required, the power electronics 130 preferably includes means for converting direct current (DC) to alternating current (AC) 162 in order to draw electrical current out of the battery 132 and into the stator 112. The means for converting DC to AC 162 can include any suitable electrical circuitry or components that are well-known in the art. For example the means for converting DC to AC 162 can include an inverter using transformers, any type of circuitry or components utilized in the commercially-available power electronics, or any other suitable circuitry or components.

In yet another state of operation, there is provided a "cruise mode" in which the majority of the engine's power is used to rotate the sprocket gear 25, but a portion of the engine's power is also used to rotate the induction rotor 114 to produce electricity. This electricity can be used to recharge the battery 132 in preparation of the next "dual-power mode." The electricity can also be used to power auxiliary components on the vehicle, such as an entertainment system, navigation system, heating and cooling system, fuel pump, compressor, etc.

The CVT or other gearing that links the induction rotor clutch hub 144 and the induction rotor 114 can be used to provide the appropriate speed of rotation to the induction rotor 114 from the induction rotor clutch hub 144. It is also known that any particular induction generator 110 has a finite capacity for generating electricity. Therefore, it may be desirable to rotate the induction rotor 114 at a speed no greater than the rate of rotation that will generate the maximum electrical output even while the RPMs of the crankshaft 12 may vary. A CVT connecting the induction rotor clutch hub 144 and the induction rotor 114 can accomplish this.

When the vehicle begins braking, the induction rotor clutch hub 144 is engaged (if not already engaged) and the sprocket gear 25 provides power, via the vehicle's rotating wheels, to the induction rotor clutch hub 144 to rotate the induction rotor 114 and generate electricity. Optionally, the electricity generated during braking can then be used to rotate the induction rotor 114 to complement the crankshaft 12 with rotating the sprocket gear 25 when acceleration is needed again. Otherwise, the electricity generated during braking can be used for any number of other purposes.

There is also provided a "starting mode" in which the induction generator 110 can be used to help start the engine. Similar to the "generator mode," the clutch hubs 142, 144 are both disengaged from the clutch drum 140 but are connected to each other by the clutch collar 146. The induction generator 110 supplies electricity to the stator 112 to rotate the induction rotor 114 which, in turn, rotates the crankshaft 12 to facilitate the starting of the engine. It is apparent that the clutch drum 140 should be disengaged so that the sprocket gear 25 does not impede the rotation of the crankshaft 12 during starting.

In yet another operation, there is provided an electric-only or "silent mode." And as discussed above, there are instances in which it may be desirable to turn off the engine and operate only on electric power. For example, this function can be useful for a vehicle operating in a city in an emissions-free zone. In this operation, the crankshaft clutch hub 142 is disengaged from the clutch drum 140 and the engine is turned off. The induction generator 110 operates as a motor and the induction rotor clutch hub 144 is engaged with the clutch drum 140 to rotate the sprocket gear 25.

Optionally, there can be provided an accessory drive gear 172 that is secured to the crankshaft 12 and can be used to provide mechanical power to fuel pump(s), oil pump(s), or the like.

Figure 42:
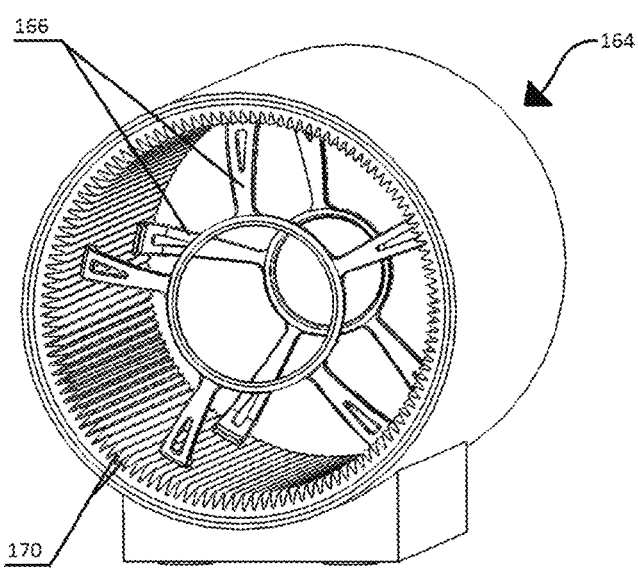
FIG. 42 is a perspective view of the nacelle and stanchions shown in isolation.
Figure 43:
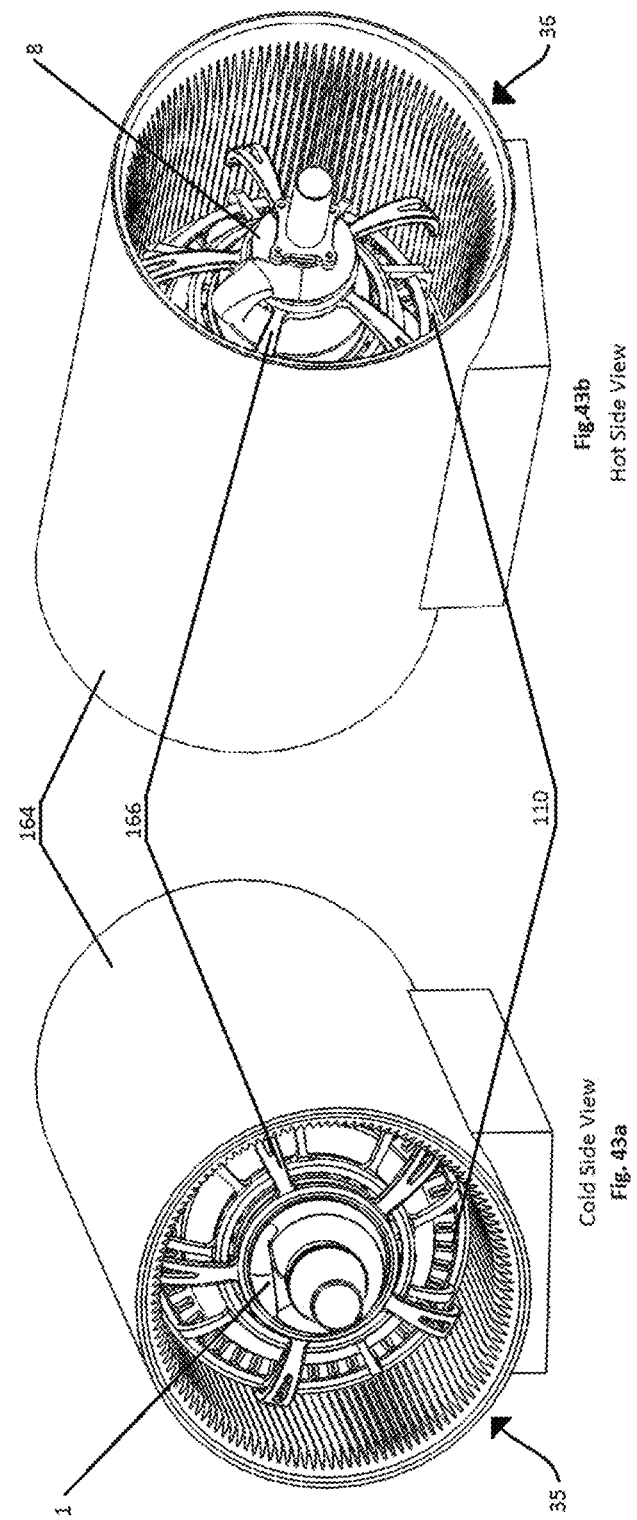
FIGS. 43a and 43b is perspective views of the assembly of the nacelle, induction generator, and the internal combustion engine showing the cold side and hot side of the engine, respectively.
Figure 44:
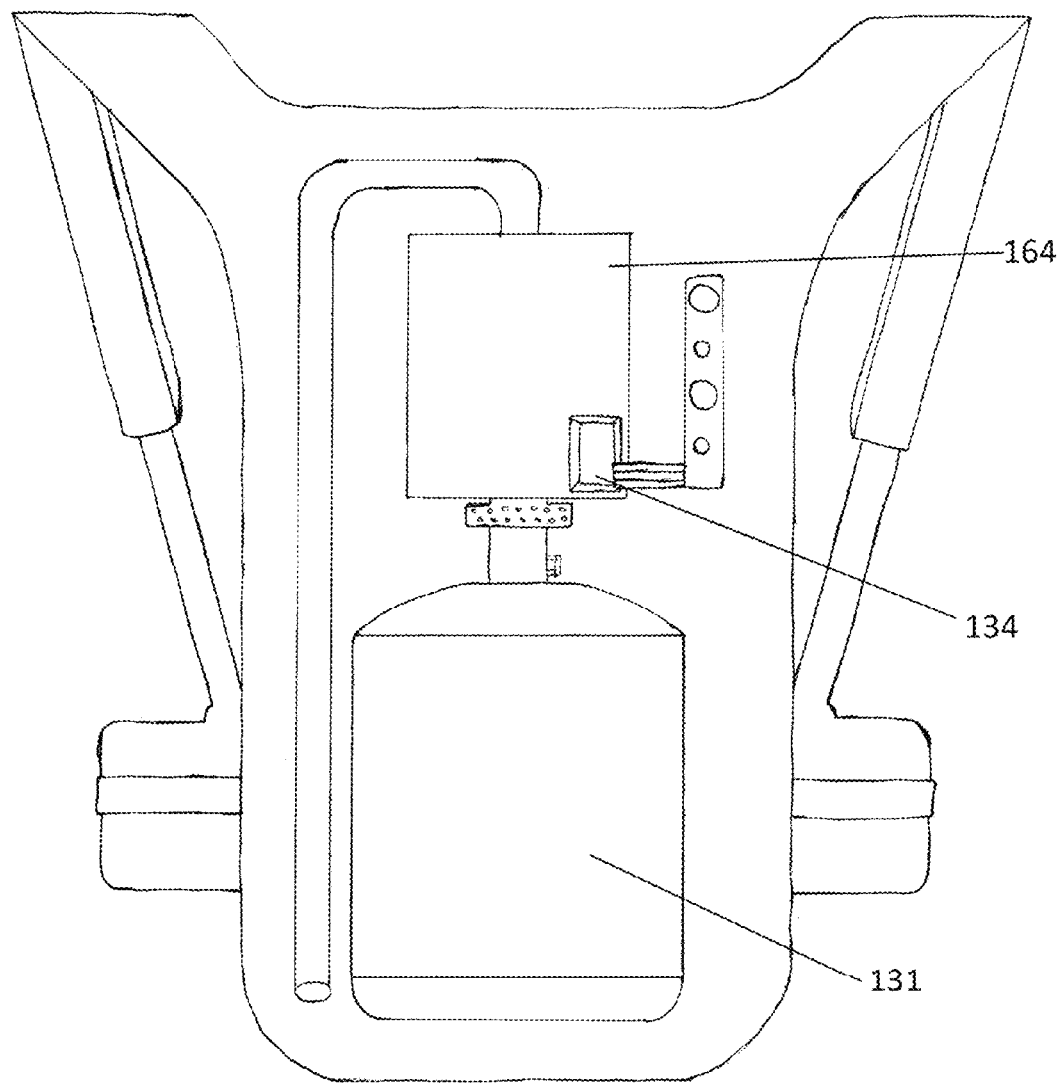
FIG. 44 is an environmental view showing one embodiment of the present invention in use as a "backpack" generator.
Figure 45:
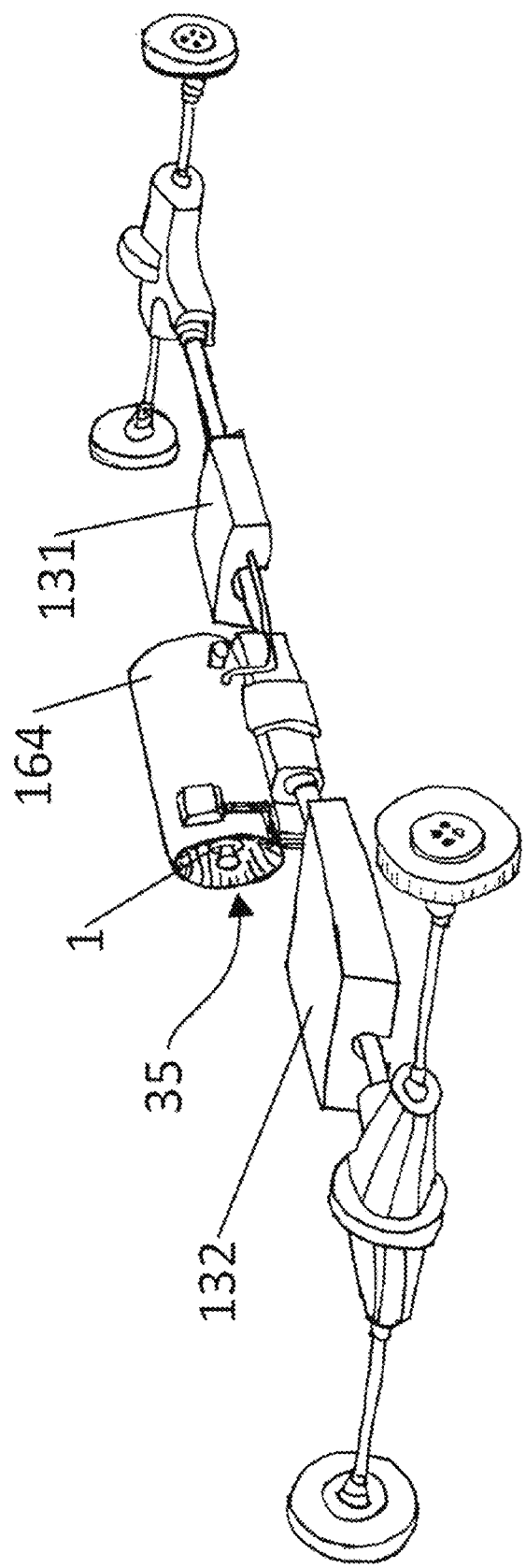
FIG. 45 is another environmental view showing an embodiment of the present invention attached to the chassis of a vehicle.

As shown in the FIGS. 39, 42, and 43, the engine and induction generator 110 can be housed within a nacelle 164. As understood by those having ordinary skill in the art, a nacelle is a cover housing that holds engines, fuel, or other equipment. Although a nacelle is typically used on aircraft, its use herein is not necessarily limited so. The nacelle 164 is preferably a hollow cylinder, or tubular, in shape and houses the engine and induction generator 110 in its center. The nacelle 164 includes a plurality of stanchions 166 to secure the engine within the nacelle 164. The stanchions 166 are preferably positioned at each end of the power plant so that they do not interfere with the induction generator 110. The nacelle 164 surrounds and supports the combustion housing 4 and the induction generator 110, and which also allows free rotation of the induction rotor 114.

The nacelle 164 can also provide system-wide cooling to the entire vehicle. The nacelle 164 can include a cooling port 165 for housing a liquid-to-liquid heat exchanger 168. The heat exchanger 168 is a conduit that passes through the cooling port 165 and carries any number of liquids. For instance, engine coolant, oil, or any other fluid that needs to be cooled can pass through a respective heat exchanger 168 to cool the liquid via the fluid in the cooling port 165.

As discussed above, there is a hot-air side 36 and cold-air side 35 to the engine. Preferably the liquid in the shared cooling jacket 163 is heated as a by-product of either the combustion process or motor/generator process, and enters into the cooling port 165 at the hot-air side 36 of the nacelle 164, and then flows toward the cold-air side 35. The cooling port 165 and the heat exchanger 168 function to remove heat from the power-plant by rejecting the heat to the current of air induced by the rotation of the induction rotor 114 via the plurality of cooling fins 170. This current of air enters the cold side of the nacelle 35, is drawn through between the cooling fins 170, and exits the hot side 36 of the nacelle, and is induced by the rotation of the induction rotor 114. The nacelle 164 therefore, is itself a liquid-to-air heat exchanger, as well as the mechanical structure which houses and supports the power-plant. The liquid-to-liquid heat exchangers 168 reside within cooling port 165, and are coupled to the engine via hoses, extend from the engine, down the stanchions 166, and into the nacelle 164. The coolant is transported from cooling jacket 163 within the power-plant to the cooling ports 165 within the nacelle 164, via similar hoses (not shown). It is also worthwhile to note that multiple cooling circuits may be incorporated within this design to allow for the various components of the assembly to be cooled and operate at their respective, and appropriate operating temperatures.

It is important to understand that in a typical vehicle, each of the auxiliary components are located throughout the vehicle and additional volumes of heat-carrying fluids (like engine coolant) are required to fill the heat exchanger conduits 168 between the heat source (e.g., engine) and the cooling source (e.g., radiator). But in this embodiment of the present invention, the nacelle 164 surrounds the engine and induction generator 110, thereby significantly reducing the length of the heat exchanger conduit 168 and providing yet another level of efficiency leading to greater vehicle performance and/or fuel efficiency.

The rotating induction rotor 114 can also assist in drawing air through the nacelle 164 from the cold-air side 35 to the hot-air side 36, and cooling fins 170 positioned about the interior surface of the nacelle 164 can also be provided to assist in heat transfer.

In another embodiment hereof, there is provided an internal combustion power-plant, comprising: a combustion housing 4 having a crankshaft 12 that is driven when a fuel is combusted in the combustion housing 4; and an induction generator 110 is positioned around the combustion housing 4 and about the common axis 34, the induction generator 110 including a stator 112 and an induction rotor 114, the induction rotor 114 rotating about the stator 112, the induction rotor 114 being mechanically coupled to the crankshaft 12, and the stator 112 being electrically connected to a power electronics 130.

This embodiment is much the same as the previous embodiment described above, except that it bears noting that this embodiment is not limited in any manner to the type or construction of internal combustion engine used. Any suitable type of engine can be used herewith.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An internal combustion power-plant, comprising:
a combustion rotor housing having a combustion chamber bore and a common axis of rotation, a combustion rotor having a combustion rotor axis, and a crankshaft having a lobe, an aperture, and a crankshaft axis, the lobe having a lobe axis spaced from the crankshaft axis, wherein the common axis and the crankshaft axis are co-axial, and the combustion rotor axis and the lobe axis are co-axial;
a compressor-turbine shaft having a first end and a second end, the compressor-turbine shaft being co-axial with the common axis and located within the aperture of the crankshaft, the crankshaft and compressor-turbine shaft are unconnected and rotate independently;
a compressor wheel located at the first end of the compressor-turbine shaft at an air intake end of the power-plant, the compressor wheel having a plurality of compressor fins;
a turbine wheel located at the second end of the compressor-turbine shaft at an air exhaust end of the power-plant, the turbine wheel having a plurality of turbine fins; and an induction generator positioned around the combustion rotor housing, the induction generator including a stator and an induction rotor, the induction rotor rotating about the stator, the induction rotor being mechanically coupled to the crankshaft, and the stator being electrically connected to a power electronics: and
a nacelle that surrounds and supports the combustion rotor housing and the induction generator, the nacelle having a plurality of cooling fins disposed about an interior surface thereof, the nacelle further having at least one fluid-filled cooling port and a liquid-to-liquid heat exchanger that extends through the at least one fluid-filled cooling port and transports a first liquid heated by the combustion rotor housing to the at least one fluid-filled cooling port, whereby heat from the first liquid is transferred to a second fluid of the at least one fluid-filled cooling port, and then from the second fluid of the at least one fluid-filled cooling port to the fins, the fins being cooled by air circulating through the nacelle.

2. The internal combustion power-plant of claim 1 wherein the stator is secured to an outer surface of the combustion rotor housing, and the stator includes electrically-conductive windings formed from a metal material.

3. The internal combustion power-plant of claim 2 wherein the induction rotor has a pair of opposed induction rotor hubs and a plurality of metallic bars extending between the induction rotor hubs.

4. The internal combustion power-plant of claim 3 wherein at least one of the induction rotor hubs is mechanically coupled to the crankshaft.

5. The internal combustion power-plant of claim 1 wherein the power electronics includes means for converting alternating current to direct current.

6. The internal combustion power-plant of claim 5 wherein the power electronics includes a battery.

7. The internal combustion power-plant of claim 1 including a clutch mechanism that is selectively engageable with the crankshaft and the induction rotor, whereby the clutch mechanism can selectively engage only with the crankshaft, can engage only with the induction rotor, or can engage with both the crankshaft and the induction rotor.

8. The internal combustion power-plant of claim 7 wherein the power electronics includes means for converting direct current to alternating current.

9. The internal combustion power-plant of claim 8 including a sprocket connected to the clutch mechanism whereby rotational energy from the induction rotor and rotational energy from the crankshaft are selectively delivered to and from the sprocket by the clutch mechanism.

10. The internal combustion power-plant of claim 1 having a first one of the at least one fluid-filled cooling ports positioned near the air exhaust end of the power-plant, and a second one of the at least one fluid-filled cooling ports positioned near the air intake end of the power-plant, and the liquid-to-liquid heat exchanger being configured to transport the first liquid from the combustion rotor housing to the first cooling port near the air exhaust end, and then to the second cooling port near the air intake end.

11. An internal combustion power-plant, comprising:
a combustion rotor housing having a combustion chamber bore and a common axis of rotation, a combustion rotor having a combustion rotor axis, and a crankshaft having a lobe, an aperture, and a crankshaft axis, the lobe having a lobe axis spaced from the crankshaft axis, wherein the common axis and the crankshaft axis are co-axial, and the combustion rotor axis and the lobe axis are co-axial; and
an induction generator positioned around the combustion rotor housing, the induction generator including a stator and an induction rotor, the induction rotor rotating about the stator, the induction rotor being mechanically coupled to the crankshaft, and the stator being electrically connected to a power electronics; and
a nacelle that surrounds and supports the combustion rotor housing and the induction generator, the nacelle having a plurality of cooling fins disposed about an interior surface thereof, the nacelle further having at least one fluid-filled cooling port and a liquid-to-liquid heat exchanger that extends through the at least one fluid-filled cooling port and transports a first liquid heated by the combustion rotor housing to the at least one fluid-filled cooling port, whereby heat from the first liquid is transferred to a second fluid of the at least one fluid-filled cooling port, and then from the second fluid of the at least one fluid-filled cooling port to the fins, the fins being cooled by air circulating through the nacelle.

12. The internal combustion power-plant of claim 11 wherein the stator is secured to an outer surface of the combustion rotor housing.

13. The internal combustion power-plant of claim 11 including a clutch mechanism that is selectively engageable with the crankshaft and the induction rotor, whereby the clutch mechanism can selectively engage only with the crankshaft, can engage only with the induction rotor, or can engage with both the crankshaft and the induction rotor.

14. An internal combustion power-plant, comprising:
a combustion housing having a crankshaft that is rotated when a fuel is combusted in the combustion housing;
an induction generator positioned around the combustion housing, the induction generator including a stator and an induction rotor, the induction rotor rotating about the stator, the induction rotor being mechanically coupled to the crankshaft, and the stator being electrically connected to a power electronics; and
a nacelle that surrounds and supports the combustion rotor housing and the induction generator, the nacelle having a plurality of cooling fins disposed about an interior surface thereof, the nacelle further having at least one fluid-filled cooling port and a liquid-to-liquid heat exchanger that extends through the at least one fluid-filled cooling port and transports a first liquid heated by the combustion rotor housing to the at least one fluid-filled cooling port, whereby heat from the first liquid is transferred to a second fluid of the at least one fluid-filled cooling port, and then from the second fluid of the at least one fluid-filled cooling port to the fins, the fins being cooled by air circulating through the nacelle.

15. The internal combustion power-plant of claim 14 wherein the power electronics includes means for converting alternating current to direct current.

16. The internal combustion power-plant of claim 14 including a clutch mechanism that is selectively engageable with the crankshaft and the induction rotor, whereby the clutch mechanism can selectively engage only with the crankshaft, can engage only with the induction rotor, or can engage with both the crankshaft and the induction rotor.

17. The internal combustion power-plant of claim 16 including a sprocket connected to the clutch mechanism whereby rotational energy from the induction rotor and rotational energy from the crankshaft are selectively delivered to and from the sprocket by the clutch mechanism.

18. The internal combustion power-plant of claim 14 wherein the induction rotor has a pair of opposed induction rotor hubs and a plurality of metallic bars extending between the induction rotor hubs, and at least one of the induction rotor hubs is mechanically coupled to the crankshaft.

19. The internal combustion power-plant of claim 14 wherein the power electronics includes means for converting direct current to alternating current.

* * * * *